US008254902B2

(12) United States Patent
Bell et al.

(10) Patent No.: US 8,254,902 B2
(45) Date of Patent: Aug. 28, 2012

(54) APPARATUS AND METHODS FOR ENFORCEMENT OF POLICIES UPON A WIRELESS DEVICE

(75) Inventors: Michael Bell, Cupertino, CA (US); Vitali Lovich, Toronto (CA)

(73) Assignee: Apple Inc., Cupertino, CA (US)

( * ) Notice: Subject to any disclaimer, the term of this patent is extended or adjusted under 35 U.S.C. 154(b) by 885 days.

(21) Appl. No.: 12/215,592

(22) Filed: Jun. 26, 2008
(Under 37 CFR 1.47)

(65) Prior Publication Data
US 2009/0325566 A1 Dec. 31, 2009

(51) Int. Cl.
*H04M 3/00* (2006.01)
(52) U.S. Cl. .......... 455/419; 455/456.3; 455/456.4
(58) Field of Classification Search .......... 455/403, 455/411, 419, 420, 456, 550.1; 370/331
See application file for complete search history.

(56) References Cited

U.S. PATENT DOCUMENTS

| | | |
|---|---|---|
| 6,664,888 B1 | 12/2003 | Bishop |
| 6,690,940 B1 | 2/2004 | Brown et al. |
| 6,753,842 B1 | 6/2004 | Williams et al. |
| 6,823,199 B2 | 11/2004 | Gough |
| 6,839,552 B1 | 1/2005 | Martin |
| 6,897,762 B2 | 5/2005 | Howells |
| 6,983,888 B2 | 1/2006 | Weng |
| 7,006,793 B2 | 2/2006 | Himmel et al. |
| 7,080,405 B2 | 7/2006 | Himmel et al. |
| 7,107,349 B2 | 9/2006 | Britt, Jr. |
| 7,783,307 B2 * | 8/2010 | Hovestadt .......... 455/456.4 |
| 2004/0253963 A1 * | 12/2004 | Park et al. .......... 455/456.2 |
| 2005/0181808 A1 * | 8/2005 | Vaudreuil .......... 455/456.3 |
| 2006/0160562 A1 * | 7/2006 | Davis et al. .......... 455/550.1 |
| 2008/0019317 A1 * | 1/2008 | Vellanki et al. .......... 370/331 |
| 2009/0176454 A1 | 7/2009 | Chen |
| 2009/0180430 A1 | 7/2009 | Fadell |
| 2009/0322890 A1 * | 12/2009 | Bocking et al. .......... 455/419 |

OTHER PUBLICATIONS

IEEE Std. 802.11 (1999 Edition) entitled "Part 11: Wireless LAN Medium Access Control (MAC) and Physical Layer (PHY) Specifications", 96 pages.
Specification of the Bluetooth System—Wireless connections made easy—Master Table of Contents & Compliance, Requirements—Covered Core Package version: 1.2 issued Nov. 5, 2003, 1200 pages.

* cited by examiner

*Primary Examiner* — Kamran Afshar
*Assistant Examiner* — Kashif Siddiqui
(74) *Attorney, Agent, or Firm* — Gazdzinski & Associates, PC

(57) ABSTRACT

Apparatus and methods for changing one or more functional or operational aspects of a wireless device, such as upon the occurrence of a certain event. In one embodiment, the event comprises detecting that the wireless device is within range of one or more other devices. In another variant, the event comprises the wireless device associating with a certain access point. In this manner, various aspects of device functionality may be enabled or restricted (device "policies"). This policy enforcement capability is useful for a variety of reasons, including for example to disable noise and/or light emanating from wireless devices (such as at a movie theater), for preventing wireless devices from communicating with other wireless devices (such as in academic settings), and for forcing certain electronic devices to enter "sleep mode" when entering a sensitive area.

29 Claims, 11 Drawing Sheets

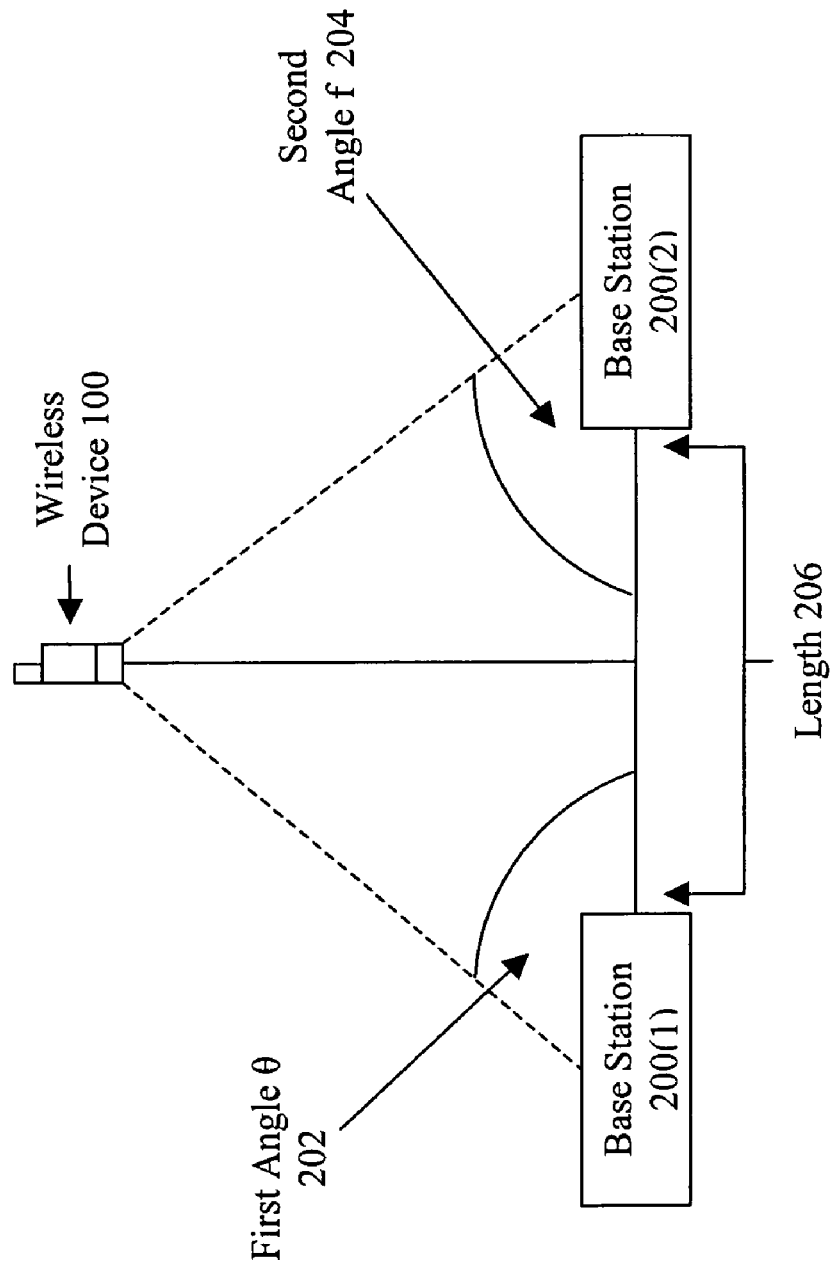

APPARATUS AND METHODS FOR ENFORCEMENT OF POLICIES UPON A WIRELESS DEVICE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communications. More particularly, in one exemplary aspect, the present invention is directed to remotely enforcing operational policies on a wireless device upon the occurrence of a certain condition.

2. Description of Related Technology

As wireless devices such as cellular telephones, pagers, personal media devices and smartphones become ubiquitous, more and more people are carrying these devices in various social and professional settings. The result is that these wireless devices can often annoy, frustrate, and even threaten people in sensitive venues. For example, cell phones with loud ringers frequently disrupt meetings, the presentation of movies, religious ceremonies, weddings, funerals, academic lectures, and test-taking environments.

Excessive lighting emanating from wireless devices can also create disruption in dark environments. While it is well known that excessive or bright lighting in a movie theater can spoil the mood of certain movies, excessive lighting can also become a more serious issue in other contexts. For example, darkrooms used to develop film can only tolerate very low amounts of ambient lighting. Some biological labs also require low levels of lighting in certain instances (for example, as in the growth of light-sensitive bacteria). Covert police or government operations may require complete "blackout" conditions. A person's sleep can even be interrupted by a bright flashing or modulating display (such as to indicate an incoming call).

Myriad other situations exist where the audible and/or visual ringing, alarm or alert functions of a wireless device are undesirable or even deleterious to the device owner or others.

Moreover, in certain situations, the communications capability that the wireless device accords to its user may be what poses the threat. For example, it is presently believed that drivers of automobiles are more likely to get into an automobile accident when they are distracted by a call on their cellular phone. Moreover, the communications functionality of wireless devices in airplanes and hospitals is presently believed to interfere with control equipment and instrumentation due to radiated electromagnetic energy, thereby jeopardizing the lives and safety of others.

Wireless devices therefore can create problems with excessive emanations of sound and light, and also by posing safety issues to others via electromagnetic radiation from their antenna. However, these are not the only problems presented by wireless devices. For example, a wireless camera hidden in an area or brought in by another individual (e.g., a cellular phone camera) where privacy is normally reasonably expected such as a department store changing room, bathroom or locker room is one example of a significant threat to such privacy. Additionally, the wireless transmission of sensitive information to a remote source is one example of a threat to security. This sensitive information could be anything from classified government information to questions or answers to an examination administered in an academic setting.

Unfortunately, the prior art does not effectively address the foregoing various problems associated with wireless devices, nor ways to mitigate their effects. For example, U.S. Pat. No. 7,107,349 to Britt, Jr. issued Sep. 12, 2006 and entitled, "System and method for disabling and providing a notification for a data processing device" discloses a method for disabling a wireless data processing device. This method comprises: receiving an indication from a user that the data processing device is missing, and responsively transmitting a disable command to the data processing device, the disable command disabling the data processing device using a first disabling technique.

U.S. Pat. No. 7,080,405 to Himmel et al. issued Jul. 18, 2006 and entitled, "Limiting device function" discloses a system, method and computer program product that sends wireless control messages to electronic devices, such as audio and video recorders, cameras, radios, televisions, mobile phones, portable or handheld computers and personal digital assistants that have come within an environment or that are in an environment that changes. In such an environment, a wireless receiver in the mobile electronic device receives the control messages. In a hardware implementation, electronic gates are set to disable the one or more features of the device. In a software implementation, current power status flags are set in a memory device within the mobile electronic device to a reduced power setting. Outside the environment, the electronic gates or power status flags revert to full power. The device driver for each feature of the mobile electronic device will reject I/O operations inconsistent with the current power status flags for that feature.

U.S. Pat. No. 7,006,793 to Himmel et al. issued Feb. 28, 2006 and entitled, "Safe use of electronic devices in an automobile" discloses a method and computer program product for operating a mobile electronic device having a wireless transceiver within an automobile having an on-board computer. The method includes: receiving a wireless information message from the mobile electronic device within the automobile to the on-board computer, establishing a wireless communication link between the on-board computer and the mobile electronic device; communicating instructions from the on-board computer to the mobile electronic device to disable a one or more features within the mobile electronic device; and then communicating reconfiguration instructions from the on-board computer to the mobile electronic device, whereby the mobile electronic device reconfigures itself to become a slave device to the on-board computer. The motorist may then utilize the mobile electronic device through the input and output devices of the on-board computer.

U.S. Pat. No. 6,983,888 to Weng issued Jan. 10, 2006 and entitled, "Portable wireless anti-theft USB disc" discloses a portable wireless anti-theft flash memory having a body proper in which there are a flash memory, a high frequency receiver circuit, and a monode switch to go with a cap, in which are a high frequency transmitter, an encoding circuit, and a counter, for casing the body proper. Connecting the body proper to a computing device enables high frequency transmitting, receiving, and turning on flash memory firewall. When the transmitting source is a distance away, the firewall becomes engaged thus disabling the flash memory to prevent loss of data from theft for safety purpose.

U.S. Pat. No. 6,897,762 to Howells issued May 24, 2005 and entitled, "Vehicle immobilization system" discloses an immobilization system for a vehicle which will assist in law enforcement. The system includes a first remote control device, which transmits a predetermined wireless control signal, and a second remote control device, which includes a first directional antenna for transmitting a selectable wireless control signal in a first direction and a second directional antenna for transmitting a wireless enable signal in a second direction. The second remote control device includes an externally operable device for selecting the wireless control signal and the enable signal to be transmitted. A receiver is included for receiving the control signal and the enable signal with the predetermined control signal being substantially unique to the receiver. A device for disabling a vehicle by police, in response to either the predetermined control signal or the selectable control signal, is provided for allowing capture of those assailants seeking to escape by use of a motor vehicle.

U.S. Pat. No. 6,839,552 to Martin issued Jan. 4, 2005 and entitled, "System and method for reporting an emergency situation" discloses a system and method for reporting an emergency situation to a called party a using a wireless device. The wireless device comprises a keyboard and a microprocessor. In one embodiment, when a specific keystroke sequence is entered using the keyboard, the wireless device performs the following tasks: disabling one or more components of the wireless device; establishing a wireless communication session with the called party; communicating with a location system to generate location information pinpointing the location of the wireless device; and providing the location information to the called party. In other embodiments, the wire device performs additional tasks, including: capturing content during the wireless communication; communicating with the location system to generate subsequent location information; and providing one or more of the subsequent location information and the content to the called party. The called party may then use the location information and the content to perform one or more actions, including providing help to the user of the wireless device.

U.S. Pat. No. 6,823,199 to Gough issued Nov. 23, 2004 and entitled, "System and method for controlling a wireless device notification alert" discloses wireless device audible alert control signal generating systems and methods. The control signal may be used to either enable or disable the audible alert of a wireless device. The signal may be generated as a function of the motion of an object entering or exiting a quiet zone. An embodiment for a system in accordance with the invention includes a transmitter to transmit a control signal to either disable or enable an audible alert of a wireless device. An antenna may be operatively coupled to the transmitter. A motion sensor to detect objects passing through a field of detection may be used to trigger the emission of the control signal. A controller operatively coupled to both the motion sensor and transmitter may command the transmitter to transmit the control signal as a function of a direction of motion detected by the motion sensor. An embodiment for a method in accordance with this invention includes detecting an object in an object detection area. A direction of motion of the object with respect to a reference point may be determined. A wireless device audible alert control signal may then be generated as a function of the direction of motion of the object.

U.S. Pat. No. 6,753,842 to Williams et al. issued Jun. 22, 2004 and entitled, "System and method for backlighting control in a wireless communication device" discloses a wireless communication device that includes a display having a backlight. A backlight controller selectively enables the backlight to minimize power consumption and conserve energy in a battery. In one embodiment, a receiver receives a time-of-day message from a remote location to set a timer with the current time-of-day. The current time-of-day is compared with a predetermined time-of-day and the backlight controller enables and disables the backlight at predetermined times-of-day. The wireless communication device may also include a GPS receiver, to determine the location of the device. The backlight controller can determine the sunrise or sunset times for the specific location. The GPS data may be used in combination with the time-of-day message. A photosensor can detect ambient light levels and generate an electrical signal corresponding thereto. The backlight controller may use the photosensor to determine ambient light levels and to enable or disable the backlight based only on ambient light levels. The photosensor signal can be used in combination with the time-of-day message and/or the location data from the GPS receiver to control the backlight.

U.S. Pat. No. 6,690,940 to Brown et al. issued Feb. 10, 2004 and entitled, "System for selective prevention of non-emergency use of an electronic device" discloses a system for selectively disabling use of at least selected features of a stand-alone electronic device under a predetermined set of conditions. The system establishes a state of the set of conditions as being satisfied or unsatisfied, communicates the state to the electronic device, and disables the selected features if the state is satisfied. In one embodiment, the system may be advantageously be used to prevent vehicular accidents by at least partially disabling non-emergency use of a wireless telephone in a moving vehicle. In another embodiment, the system may be used to disable features of an electronic device within a predetermined area having a boundary that is independent of a communications network cell.

U.S. Pat. No. 6,664,888 to Bishop issued Dec. 16, 2003 and entitled, "Method and apparatus for enabling and disabling certain functions of an automobile" discloses an apparatus and method designed for use with a vehicle that remotely activates an audio warning device prior to disabling the ability for the driver to start the vehicle. The apparatus is installed in the vehicle and includes a special pager receiver that decodes paging messages sent from a paging transmitter site. The pager receiver is electrically connected to a controller which interprets the coded message. An in-vehicle digital radio transmitter then sends a wireless transmission to digital radio receivers installed in the vehicle. Each digital radio receiver is incorporated in a package that includes an electrical connection to an electromagnetic relay. The relay is plugged into the electrical circuits of the vehicle which activate certain devices or functions, such as the starter motor, ignition system, power door locks, headlamps, horn, and other system that may use electrical relays. The digital radio receivers decode the transmissions from the in-vehicle transmitter and decide whether to open or close their respective relays, thus disabling or enabling certain devices or functions in the vehicle. The invention finds applicability for use by lender institutions in order to disable vehicles when the owner has not kept his account current.

Other prior art approaches (including prior generation laptop computers manufactured by the Assignee hereof) include the capability to display the status of a wireless access point or station (e.g., WiFi "AP" or "STA", respectively). However, such capability provided no control of the wireless device, in that it could only provide for the display of status information.

Despite the foregoing variety of different approaches to wireless device control, none satisfies the salient need of providing an apparatus and methods of automatically disabling, replacing, or modifying the functionality of a wireless device upon the occurrence of a certain condition, such as for instance entering a particular location or venue. Ideally, such apparatus and methods would in one aspect allow certain designated zones or areas to enforce policies regarding wireless device operation, and be protected from externalities such as ringing or alarms, display functions, etc. associated with the wireless device. This would also ideally prevent or frustrate the use of wireless devices for inappropriate purposes.

Moreover, such apparatus and methods would also ideally not require significant infrastructure changes or upgrades for implementation.

SUMMARY OF THE INVENTION

The present invention satisfies the foregoing needs by providing, inter alia, methods and apparatus for changing the functionality and/or configuration available in a wireless device, such as upon the occurrence of a certain condition or event.

In a first aspect of the invention, an apparatus is disclosed. In one embodiment, the apparatus comprises: a first module adapted to detect that a wireless device comprising a first set of functions is within a first range; and a second module adapted to cause at least one of the first set of functions to be modified based at least in part upon the first module detecting that the wireless device is within the first range.

In one variant, the wireless device comprises a cellular-enabled mobile device having a wireless LAN (WLAN) interface, and the apparatus is contained substantially within the mobile device. The first set of functions comprises e.g., an audible ringer functionality, and wherein the modification comprises suppressing or muting the audible ringer functionality.

In another variant, the first set of functions comprises a first lighting configuration having a first intensity associated therewith, and the modification comprises a second lighting configuration having a second intensity associated therewith, the second intensity being less than the first intensity. The second lighting configuration may comprise in one variant a different number e.g., fewer selectable settings than the first lighting configuration.

In yet another variant, the first set of functions comprises Bluetooth inquiry and pairing functions, and wherein the modification comprises disabling at least one of the inquiry and pairing functions.

Alternatively, the first set of functions comprises a first power setting, and wherein the modification comprises a second power setting, the second setting consuming less electrical power than the first setting.

As yet another alternative, the first set of functions comprises a first security policy, and wherein the modification comprises a second security policy that imposes higher security requirements than the first policy. For example, the second access policy might comprise at least: an authentication requirement; a password requirement; and an encryption requirement.

In another variant, the first set of functions does not require that the wireless device remain in sleep mode, and wherein the modification requires that the wireless device: (i) enter and remain in sleep mode while within the first range; or (ii) remain in sleep mode while within the first range if already in the sleep mode when first entering within the first range.

In still a further variant, the first module is adapted to detect that the wireless device is within the first range using at least global positioning system (GPS) signals.

Alternatively, the first module is adapted to detect that the wireless device is within the first range using at least triangulation based on two or more radio frequency signals.

As yet another alternative, the first module is adapted to detect that the wireless device is within the first range based on association or attempted association of the wireless device with a base station or access point.

In another variant, the wireless device comprises a cellular-enabled mobile device having a wireless LAN (WLAN) interface, and the apparatus comprises a base station or access point (AP) also having a WLAN interface capable of communicating with the WLAN interface of the mobile device.

In a second aspect of the invention, a method of operating a wireless network having at least one access point is disclosed. In one embodiment, the method comprises: providing at least one operational policy for the at least one access point; enforcing the at least one policy for a user wireless device when the device is associated with the access point, the enforcing comprising defeating user control of at least one component of the wireless device controlled by the at least one policy; and not enforcing the at least one policy for the wireless device when the device is not associated with the access point.

In one variant, the network comprises an IEEE-Std. 802.11 compliant wireless network, and the at least one access point comprises an 802.11 Access Point (AP), and the act of providing at least one policy comprises setting a policy which controls an audio subsystem of the user wireless device. For example, the user wireless device may comprise a mobile device (e.g., handset), and the control of the audio subsystem comprises suppressing or muting an audible ringer.

In another variant, the act of providing at least one policy comprises setting a policy which enforces a certain behavior in a security subsystem of the user wireless device. The behavior comprises for example utilizing at least one of a prescribed: (i) encryption scheme; (ii) authentication scheme; and (iii) message data integrity scheme.

In yet another variant, the act of providing at least one policy comprises setting a policy which enforces a certain behavior in a display subsystem of the wireless device; e.g., adjusting at least one of the: (i) brightness; and (ii) intensity, of a display of the device.

In still a further variant, the wireless network comprises an IEEE-Std. 802.11 compliant wireless network, and the method further comprises determining, via at least the access point, whether to selectively enforce the at least one policy against the user wireless device.

In another variant, the wireless network comprises an IEEE-Std. 802.11 compliant wireless network, and the method further comprises determining, via at least the user wireless device, whether to selectively enforce the at least one policy against the user wireless device.

Alternatively, the method further comprises providing a user of the user wireless device at least one opportunity of accepting or rejecting association with the access point before the association is created and the at least one policy enforced; e.g., generating a display on the wireless device indicating the at least one policy associated with the at least one access point. The at least one access point may comprise a plurality of policies, and the generating a display may comprise for example generating distinct icons or graphical images for each of the plurality of policies of the at least one access point.

In another variant, the method further comprises configuring the user wireless device so as to implement a user-specific policy; e.g., determining whether or not to associate with the at least one access point based at least in part on the at least one operational policy.

In yet a further variant, the at least one access point comprises a plurality of wireless interfaces, each having independent policy functions.

Alternatively, the defeating user control of at least one component of the wireless device controlled by the at least one policy comprises blocking or disabling user control of at least one of: (i) an audio or audible function of the wireless device; or (ii) a display function of the wireless device.

In a third aspect of the invention, a method of operating a wireless network having an access point and at least one wireless mobile device having a wireless interface adapted to communicate with the access point is disclosed. In one embodiment, the method comprises: providing at least one operational policy for the access point, the at least one operational policy not being associated with the operation of the wireless interface; enforcing the at least one policy for the wireless mobile device when the device is associated with the access point; and not enforcing the at least one policy for the wireless mobile device when the device is not associated with the access point.

In another embodiment, the method comprises: providing at least one operational policy for the access point; determining a user-based policy for association between the user wireless device and the access point; evaluating the at least one operational policy and the user-based policy to determine if the association is permitted; and if the evaluating indicates that the association is permitted: creating the association; and enforcing the at least one policy for the user wireless device when the device is associated with the access point.

In one variant, the method further comprises transmitting a command causing wake-up of the wireless mobile device from a sleep or reduced power mode so as to facilitate the determining the user-based policy. The access point may determine whether the wireless mobile device is in the sleep or reduced power mode before the act of transmitting.

In a fourth aspect of the invention, network apparatus adapted for communication with at least one mobile user is disclosed. In one embodiment, the apparatus comprises: first apparatus adapted to provide a wireless interface with a mobile device of the at least one user; and second apparatus in data communication with the first apparatus and adapted to run a computer program, the computer program adapted to enforce one or more policies with respect to the mobile device during operation thereof and communication with the network apparatus.

In one variant, the network apparatus comprises a gateway or access point providing data communication to another network, and the wireless interface comprises an air interface compliant with IEEE-Std. 802.11.

In another variant, the one or more policies comprises a policy that substantially mutes or reduces the volume of an audible sound that would otherwise be generated by the mobile device.

Alternatively, the one or more policies comprises a policy that substantially reduces at least one of the brightness and intensity of a display device of the mobile device.

As yet another alternative, the one or more policies comprises a policy that substantially prevents at least one mode of communication between the mobile device and another proximate mobile device.

As still a further alternative, the one or more policies comprises a policy that substantially prevents at least one mode of communication between the mobile device and a radio frequency transceiver distinct from that associated with the wireless interface; e.g., a cellular basestation transceiver. In another variant, the radio frequency transceiver comprises a Bluetooth transceiver, and the substantially preventing at least one mode of communication comprises preventing at least one of Bluetooth inquiry or pairing.

Alternatively, substantially preventing at least one mode of communication comprises preventing only incoming or received communications, but allowing outgoing communications over the radio frequency transceiver.

In a fifth aspect of the invention, a wireless device is disclosed. In one embodiment, the device comprises: a first module adapted to receive a signal from a transmitting device, the signal comprising at least one command adapted to invoke changes in a plurality of functions of the wireless device, the plurality of functions selected from the group consisting of: (i) a display function; (ii) an audible alert or alarm function; (iii) a power conservation mode; and (iv) a communications interface mode; and a second module adapted to process the at least one command to change the plurality of functions of the wireless device.

In one variant, the device further comprises logic adapted to determine whether a user of the wireless device has agreed to invoke the changes before the command is processed by the second module.

In another variant, the device further comprises logic adapted to transmit information relating to whether a user of the wireless device has agreed to invoke the changes to a wireless base station or access point in communication with the wireless device.

In another embodiment, the wireless device comprises: a first module adapted to detect an available wireless access point; a second module adapted to receive one or more policies from a detected access point; a third module adapted to display an indication relating to the one or more policies to a user; a fourth module adapted to receive a user input indicating that the user agrees to the one or more policies; a fifth module adapted to connect the wireless device to the detected access point if the user agrees to the policies; and a sixth module adapted to enforce the one or more policies on the wireless device during a connection with the access point.

In one variant, the one or more policies comprise a policy relating to audible ringer functionality.

In a second variant, the one or more of policies comprise a policy relating to the amount of visible light the wireless device may emanate.

In yet another variant, the one or more policies comprise a policy relating to the type of content accessible over a network.

In a further variant, the one or more policies comprise a policy relating to communications with other wireless devices.

In a sixth aspect of the invention, a method of doing business is disclosed. In one embodiment, the method comprises: providing a wireless access portal in a location, the portal enabling data communication between at least one wireless portable device and a network entity in data communication with the portal; and providing via the portal, in exchange for consideration, operational policy enforcement for a wireless portable device of a user when the wireless portable device is in communication with the portal.

In one variant, the consideration is provided by the user as part of a service subscription.

In another variant, the consideration is provided pursuant to a wireless credit or debit transaction between the user and a service provider. For example, the wireless credit or debit transaction between the user and a service provider is conducted substantially over the portal. Alternatively, the wireless credit or debit transaction between the user and a service provider is conducted over a cellular link established between the wireless device and a network entity in data communication with the cellular link.

In another variant, the consideration is provided by the user to an owner of the portal.

In a seventh aspect of the invention, a computer readable apparatus is disclosed. In one embodiment, the apparatus comprises a storage medium, the medium adapted to store at least one computer program, the at least one program comprising a plurality of instructions which, when executed: receive information regarding an association between a wireless access point and a mobile device; evaluate the received information to determine whether a one or more operational policies should be applied to the mobile device; and cause the transmission of information to the mobile device to cause the mobile device to invoke the one or more operational policies on the mobile device while the association exists.

In one variant, the at least one computer program is further configured to perform at least one of the following if the evaluation determines that the one or more policies should not be applied to the mobile device: (i) prevent the association from being formed; or (ii) terminate the association if the association has already been formed.

In another variant, the information comprises information indicating whether a user of the mobile device agrees to the one or more policies being enforced on the mobile device. For example, the apparatus may comprise a storage device that is part of a wireless base station or access point (AP) compliant with a WiFi standard, and the transmission comprises using a beacon signal generated by the base station or AP to transmit the information that causes the invocation of the one or more policies. The information may comprise e.g., one or more commands disposed within a vendor-specific element of the beacon signal.

Alternatively, the at least one computer program is further configured to cause transmission of information relating to the one or more policies to the mobile device before the evaluation is conducted, the information relating to for example the one or more policies comprises information which causes one or more graphical display elements to be generated on a display of the mobile device, the one or more display elements being uniquely correlated to respective ones of the one or more operational policies.

In an eighth aspect of the invention, a method of suppressing wireless communications from a mobile wireless device within a given area using a wireless base station, the method comprising using the base station to communicate with the mobile device, the communication comprising at least one command causing the mobile device to disable or suppress communications over the base station or other communication channels available to the mobile device while the mobile device is within the given area.

In one variant, the method further comprises determining when the mobile device is within the given area based at least in part on the mobile device attempting to or actually associating with the base station.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 2 is a block diagram illustrating an exemplary triangulation process useful with various embodiments of the present invention.

DETAILED DESCRIPTION OF THE INVENTION

Figure 1:
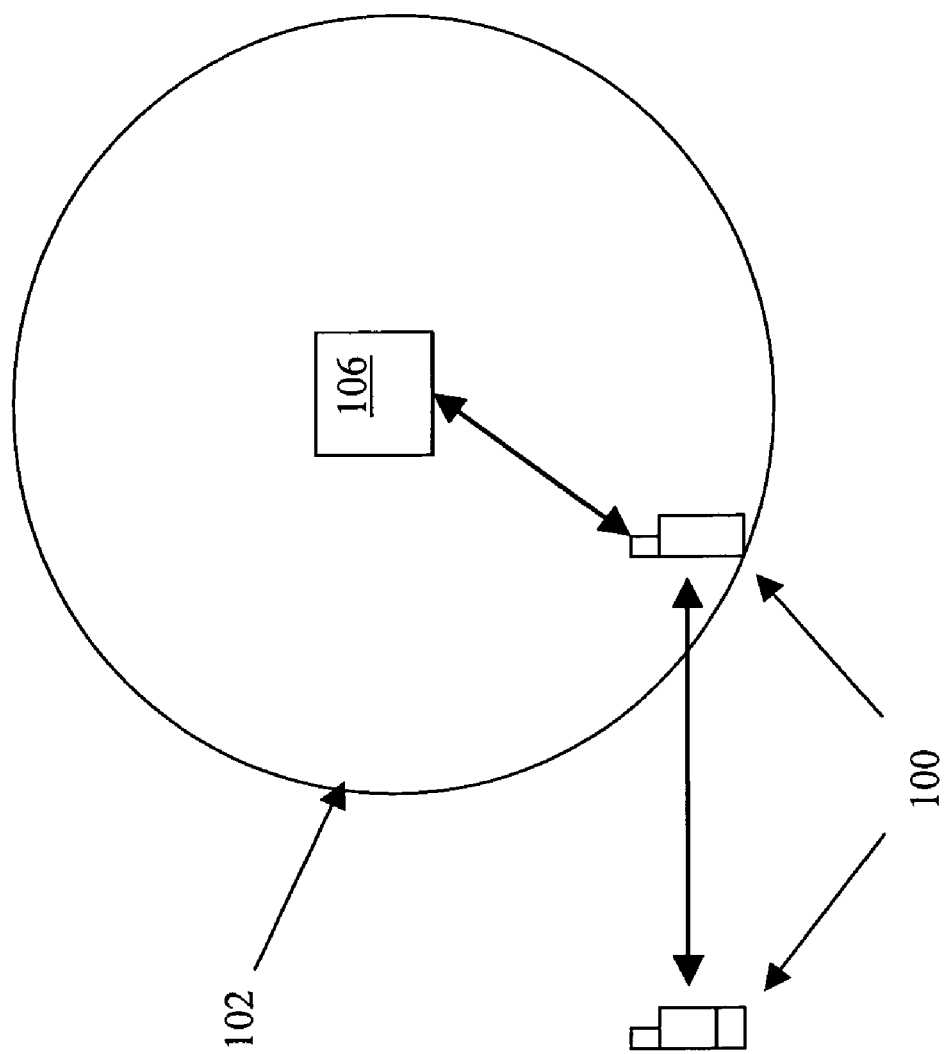
FIG. 1 is a block diagram illustrating one exemplary embodiment of a system architecture capable of enforcing one or more policies on a mobile device according to the invention.

Reference is now made to the drawings, wherein like numerals refer to like parts throughout.

As used herein, the term "access point" or "AP" refers generally and without limitation to a network access point (e.g., such as a gateway or router) which allows access for one device to one or more other networks. For example, one type of access point might comprise an Ethernet router. Another type of access point might comprise an IEEE Std. 802.11 WiFi AP. These terms should in no way be construed as to be limiting to a particular network standard, protocol, or topology.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the Java™ or J2ME environment.

As used herein, the term "association" refers generally and without limitation to a relationship formed or maintained for at least a period of time between two or more devices or processes for the purpose of accomplishing a function such as data transfer, communication, or secure tunneling. For example, one such association comprises the association formed between a station (STA) and an access point (AP) within the context of IEEE Std. 802.11 (1999 Edition) entitled "Part 11: *Wireless LAN Medium Access Control (MAC) and Physical Layer (PHY) Specifications*", which is incorporated herein by reference in its entirety, including inter alia associations, disassociations, reassociations, authentications, and deauthentications as described in Chapter 5 of the foregoing Standard. Another example of an association may comprise a Bluetooth Master/Slave pairing or bonding of the type set forth in "*Specification of the Bluetooth System—Wireless connections made easy—Master Table of Contents & Compliance, Requirements—Covered Core Package version: 1.2*" issued 5 Nov. 2003, which is also incorporated herein by reference in its entirety. Yet another example of an association comprises a security-based association comprising e.g., authentication, identification, and/or encryption/integrity key exchange procedures of the type well known in the computer networking arts.

As used herein, the term "capacity" refers to, without limitation, the ability of a network, portion of a communication channel, network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as errors or delays imposed by transmission, filtering, transcoding, encryption/decryption, and so forth.

As used herein, the term "cellular" refers without limitation to any wireless telecommunications (and/or data) apparatus or system providing multiple user access including for example those of the 2G, 2.5G, 3G, or AMPS families. Well known cellular standards and technologies include e.g., UMTS, GSM, 3GPP/WCDMA, 3GPP2 (CDMA2000), IS-95, IS-136, IS-54, NAMPS, and PCS-1900.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the term "metadata" comprises without limitation extra data not typically found in typical primary content (or at least not visible or audible to the users of the network). This metadata can be provided with the content from its source or provider, or alternatively added by the transmission device (e.g., cellular telephone or base station) or the network operator. Metadata is typically packaged in a prescribed format (e.g., XML) and may optionally be made human-readable. Alternatively, non-human readable data can be used, such as where the metadata is encoded in hexadecimal or binary, or any other number of different coding schemes.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "mobile device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs) such as the exemplary iPod™ media device manufactured by the Assignee hereof, and smartphones such as the exemplary iPhone™ multi-function media and telephony device manufactured by the Assignee hereof.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols and standards (e.g., SONET, DOCSIS, IEEE Std. 802.3, 802.11, 802.15, 802.16, 802.20, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a, b, g, n, etc.), WiMAX (802.16), PAN (802.15), Bluetooth, or IrDA families.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/e/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, CDMA2000, etc.), FHSS, DSSS, GSM, PAN/802.15, WiMAX (802.16), Mobile Broadband Wireless Access or MWBA (802.20), narrowband/FDMA, OFDM, PCS/DCS, analog cellular, CDPD, satellite systems, millimeter wave or microwave systems, acoustic, and infrared (i.e., IrDA).

Overview

One salient aspect of the present invention relates to selectively deactivating or modifying wireless communication protocols (for example, cellular telephony communications, WiFi or WiMAX communications, and/or Bluetooth functionality) and/or other operational functions (e.g., audible ringers, display functions, security functions, etc.) associated with a mobile device.

In some embodiments, the location of the mobile device serves as a trigger to changing its functional or operational settings. In one exemplary variant, the "location" of the mobile device is determined relative to its associated base station or access point; i.e., by associating with a given base station, at least the location of the mobile device relative to the base station is known to some degree of accuracy. If the absolute location of the base station is known, the absolute location of the mobile device is also generally known, all without requiring the mobile device to carry global positioning system (GPS) or other position locating apparatus.

In certain other variants, GPS or other such external signals are used to determine the location of the portable electronic device. Alternatively, cellular tower or WiFi base station triangulation is used to determine the mobile device's location.

When the "trigger" criteria are met, the mobile device is instructed to implement the desired functional and/or operational changes ("policies"), such as via a communication from the base station to the mobile device. In one variant, IEEE-Std. 802.11 WiFi broadcasts or beacons incorporate designated policy enforcement commands. Once the user leaves the access point or the trigger criteria are no longer met, the device is automatically restored to its previous mode (or a default or secondary mode).

The user of the mobile device may also be required or given the opportunity to "opt in" for one or more policies being enforced by the base station, the assent to which may be used as a precondition for forming a wireless association or security association with the base station, or maintaining an existing one.

In one embodiment of the invention, the access point (AP) or base station contains all of the intelligence via e.g., a policy controller or resident computer program, necessary to implement the policies of that AP/base station on one or more associated mobile devices. Extant communication protocols (including for example the aforementioned WiFi beacon function) are used to communicate commands from the AP or base station to the mobile device(s). These commands may vendor-specific in nature (e.g., one manufacturer's phone may require a certain format or protocol to enforce certain policies, while another manufacturer's device requires a different command or protocol to enforce the same policies).

In another embodiment, the AP or base station cooperates with a client program or module on the mobile device (e.g., policy client application) which assists in selecting and enforcing policies on the mobile device, some of which may be user-specified.

The present invention advantageously lends itself to numerous different applications and uses, including for example in movie theaters, enterprise applications (e.g., business meetings, or to secure sensitive data), academic settings (e.g., lectures or exams, so as to prevent interruptions and also surreptitious communications or "cheating"), home or residence environments, or even in automobiles (e.g., prevent non-hands free use of cellular telephones when a user is sitting in their car and it is moving). Moreover, the invention lends itself to many different business paradigms and methods.

DESCRIPTION OF EXEMPLARY EMBODIMENTS

Exemplary embodiments of the present invention are now described in detail. It will be appreciated that while these exemplary embodiments are described primarily in the context of a WiFi (i.e., IEEE Std. 802.11) air interface and protocol, this context is merely illustrative, and the invention is in no way so limited to WiFi applications (or any other air interface or specification). For example, the invention may be readily practiced within the context of a PAN (e.g., 802.15), WiMAX (802.16), MWBA (802.20), or even cellular (e.g., 3G) network.

It will also be appreciated that while described in the context of wireless devices, the present invention may be used in conjunction with wired data scenarios; e.g., a user plugging an Ethernet cable from their mobile laptop computer into a hub or router in a school library or corporate meeting room for example.

Various embodiments of the present invention are directed to methods for enforcing one or more policies upon a wireless (or wired) device during or after the occurrence of a certain condition or event. In a first set of variants described below, the condition relates to the position or location of the device relative to one or more reference points. In some embodiments, these reference points are stationary, while in other embodiments, the reference points are mobile.

In other variants, the event causing the imposition of one or more policies is temporal in nature; i.e., after a certain amount of time passes, or a certain chronological coordinate (e.g., 2:00 pm PST on Feb. 14, 2008) is reached. This type of approach may be tied to the aforementioned location-based variants (i.e., where both chronological and position requirements are met), or operate completely independent thereof (i.e., irrespective of location or even association with a given AP or base station, such as in a corporate-wide disablement of Internet or data access privileges, campus-wide disablement of communication privileges during final exams, or the like).

In yet other variants, the imposition of one or more policies may be voluntary (e.g., by a user affirmatively entering a command or selecting acceptance of a policy without prompting), irrespective of whether the device is currently in association with a wireless access point or base station.

Various other approaches will be recognized by those of ordinary skill given the present disclosure; the following exemplary embodiments being merely illustrative of the broader aspects of the invention.

System Architectures

Referring now to FIG. 1, a first embodiment of the architecture for enforcing one or more policies on a mobile device is disclosed. In this embodiment, the mobile device 100 is associated with a base station or AP 106. The wireless device 100 may be any device comprising at least one air interface. These interfaces include one or combinations of WiFi (variants of IEEE 802.11 standard), Bluetooth, Ultra-wideband (UWB), WiMAX (IEEE 802.16 standard), wireless PAN (e.g., UEEE 802.15 standard), Wibree (Bluetooth digital radio), mobile broadband wireless access (Mobile-Fi or 802.20), and cellular interfaces (e.g., 3G/UMTS) for example.

Policy is enforced by the base station 106 on the mobile device 100 purely by virtue of the association; no ranging data or determination is made. The "range" of policy enforcement 102 illustrated is only by virtue of the physical capabilities of the air interface (e.g., WiFi link) between the mobile device 100 and the base station 106, which as is well known may vary as a function of radiated power, geographical topography, presence of structures, Rayleigh fading or other multipath artifacts, level of ambient interference, etc. Stated simply, any mobile device 100 that can communicate sufficiently with the base station (and vice versa) will have the policies of that base station enforced upon it (assuming any other relevant criteria are met).

It will also be appreciated that, as discussed in greater detail below, if a mobile device 100 does successfully associate with the base station 106, and the location of the base station is known, then the location of the mobile device 100 is also then known (at least to the degree of the communications range 102 previously described). This approach advantageously alleviates the mobile device from having to carry GPS (Global Positioning System) or other such positioning apparatus and determine its own position. However, it will be recognized that the embodiment illustrated in FIG. 1 need not derive any location or position information to operate; the base station may merely enforce policy on any mobile device associating with it irrespective of the location of the base station or range to the mobile device.

Figure 1A:
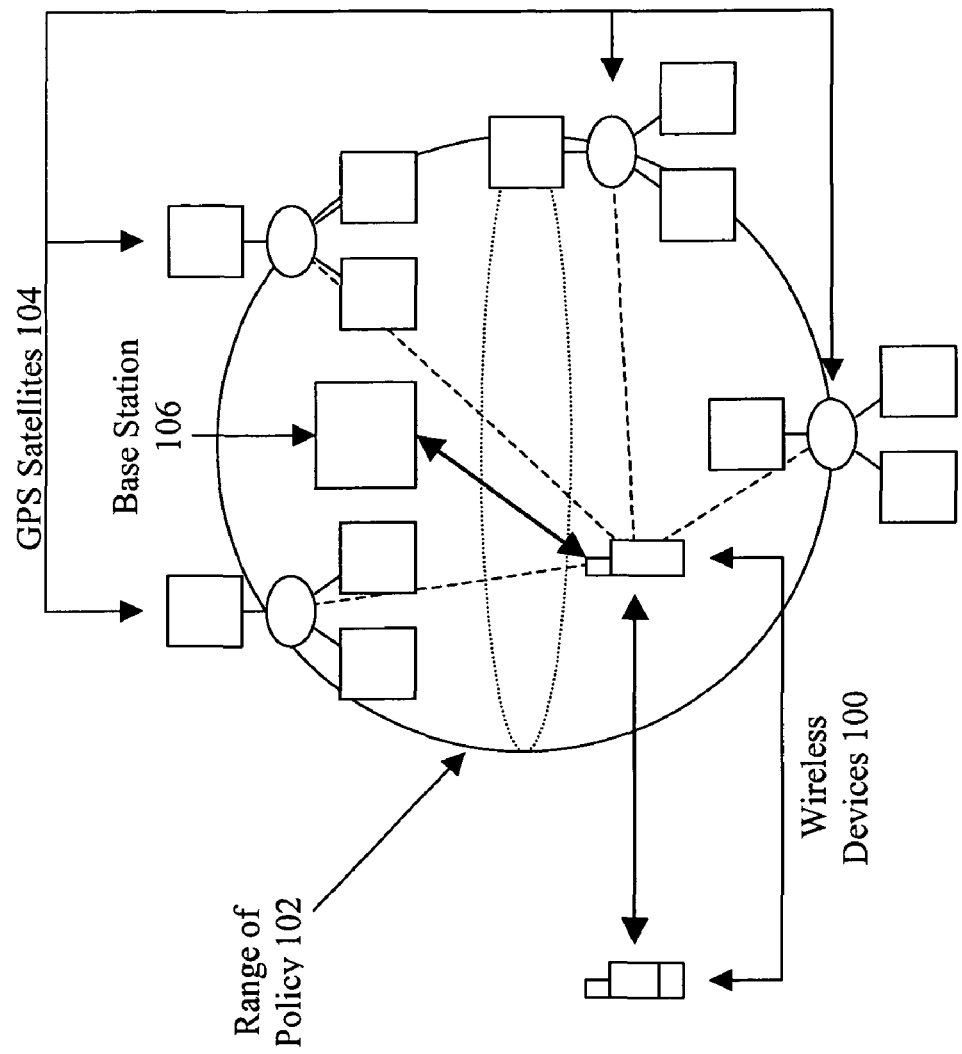
FIG. 1a is a block diagram illustrating another embodiment of the system architecture of the invention, wherein device location or range information is utilized.

FIG. 1a is a block diagram illustrating another embodiment of the architecture for enforcing a policy upon a wireless device which has entered the range designated for the policy. Note that while the embodiment depicted by FIG. 1a utilizes GPS signaling, any form of handset- or network-based localization may be used in accordance with the scope of the present invention.

Figure 4:
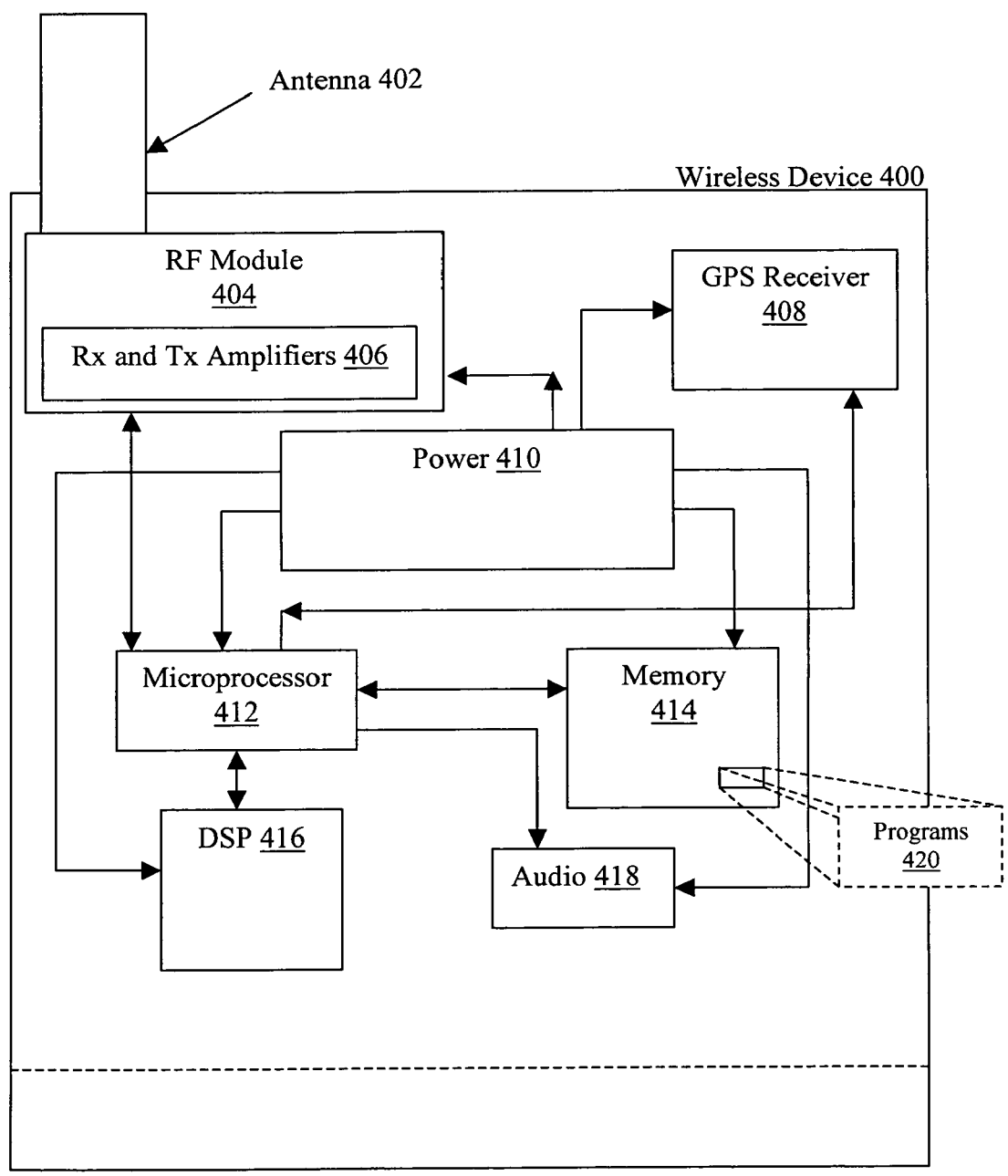
FIG. 4 is a block diagram illustrating the components of an exemplary embodiment of a wireless device capable of GPS positioning in accordance with the present invention.

In the embodiment depicted by FIG. 1a, the wireless device 400 comprises a GPS receiver 408 (depicted in FIG. 4 herein). The GPS receiver enables the wireless device to communicate with one or more GPS satellites 104 in order to determine the wireless device's present location as is well known in the art.

In one variant, the wireless device 400 periodically transmits its GPS coordinates to the base station 200. The base station 200, upon receipt of said GPS coordinates and a wireless device identifier, analyzes whether these coordinates are within the range of the designated policy 102. It is noted that individual policies enforced on the mobile device may have different enforcement ranges; e.g., a first policy will only be enforced at radius R1, wherein a second policy is enforced at R2, and so forth.

If the GPS coordinates are within the designated range 102 for that policy, the base station 200 sends a control signal or command to the wireless device 400 thereby setting the device's functionality according to the governing policy. In some embodiments, the base station 200 sends a separate control signal to the wireless device 400 once the device's GPS coordinates indicate that it is out of the designated range 102. In this manner, the prior settings of the wireless device 400 may be restored once it is no longer in the designated range 102. Other approaches for restoring prior wireless device configuration may also be used consistent with the invention, including for example the expiry of a timer, the base station/AP shutting down, the loss of association between the device and the base station (such as due to interference), etc.

It will also be recognized that both relative and absolute position or location approaches may be used consistent with the present invention where such information is required. For example, one instance of a relative location approach comprises where the location of a mobile device is determined via its association with a given base station or AP, whose location may or may not be known. By virtue of such association, one knows at minimum that the mobile device is within a prescribed range of the AP (otherwise the association could not exist). If the AP location is unknown or not in a fixed location, the foregoing information is none-the-less valid. However, if the absolute location of the AP is known (e.g., located at a given lat./long. or GPS coordinate), then the mobile device absolute location is also known (to at least the degree of precision of the aforementioned prescribed range) as previously described.

Alternatively, the mobile device location may be determined in an absolute sense irrespective of any association with an AP, or the AP's position. For example, the mobile device may carry a GPS receiver of the type well known in the art as in the embodiment of FIG. 1a which can tell the mobile device (and user) their actual or absolute location within the precision of the GPS system. Other external "fix" techniques can be employed, including e.g., triangulation of two or more RF beacons as is used in cellular triangulation, LORAN or similar navigational aids, user input regarding proximity to a known location (e.g., "I am at the corner or $5^{th}$ and Broadway in downtown San Diego, Calif."). Yet other approaches will be recognized by those of ordinary skill.

FIG. 2 is a block diagram illustrating an exemplary triangulation process useful with various embodiments of the present invention. As the figure illustrates, the location of the wireless device 100 can be derived from knowing only: i) the distance or length 206 between two base stations 200(1) and 200(2); ii) a first angle θ 202 formed from the wireless signal received at the first base station 200(1) and the path of the length 206; and iii) a second angle f 204 formed from the wireless signal received at the second base station 200(2) and the path of the length 206. By utilizing the process of triangulation at the base station 200 level, a wireless device can then be located without the need for installing, for example, a GPS receiver 408 within the wireless device 100. The base stations 200(1) and 200(2) may comprise for example cellular base stations which generally have indigenous capability to resolve angles based on e.g., sectored antenna configurations, although other approaches may be used as well.

Figure 3:
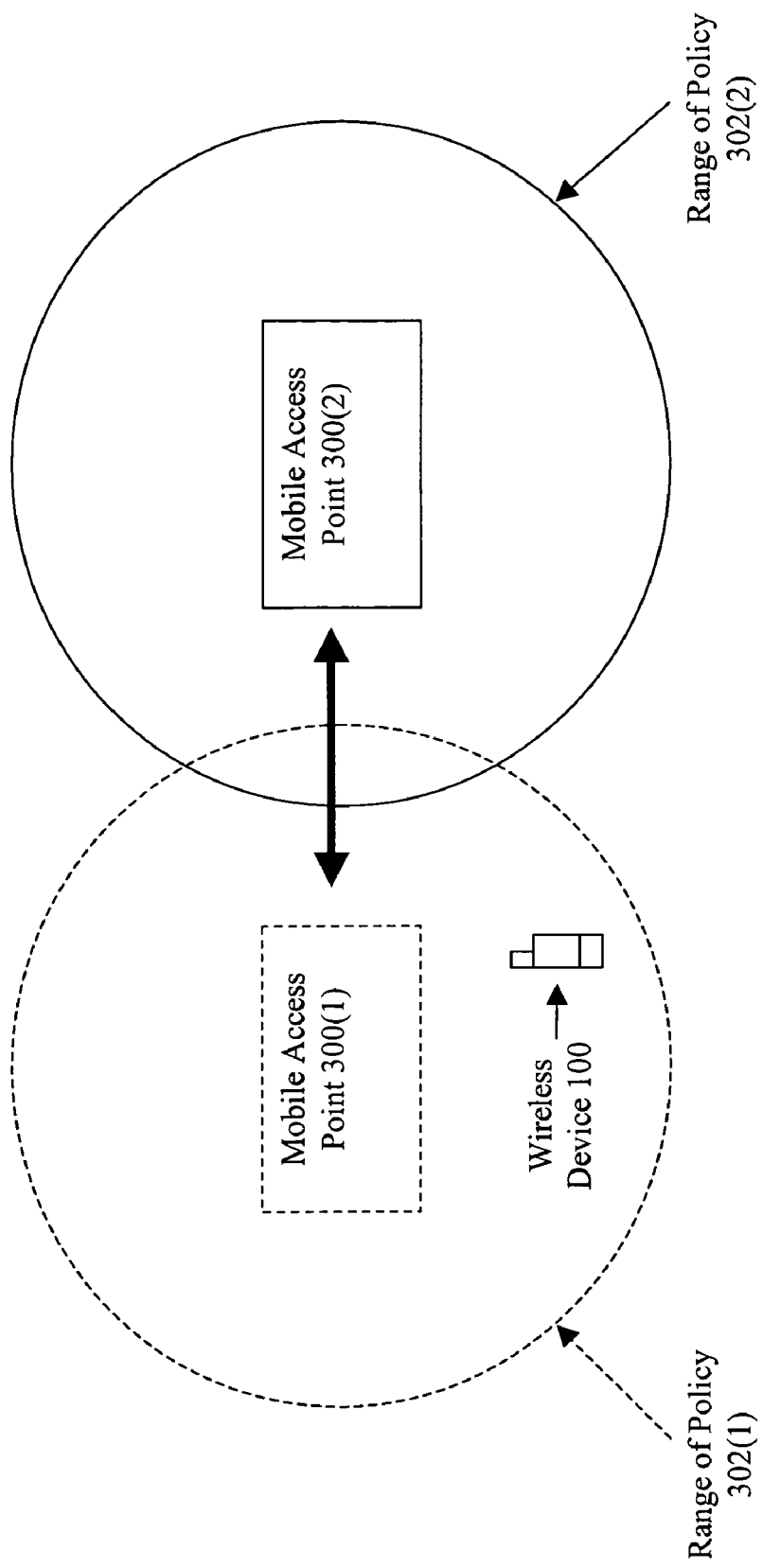
FIG. 3 is a block diagram illustrating one exemplary architecture for enforcing a policy on a wireless device from a mobile access point (AP).

FIG. 3 is a block diagram illustrating one architecture for enforcing a policy on a wireless device from a mobile access point. According to the embodiment depicted by FIG. 3, the range of the first policy 302(1) is defined as a perimeter or distance from the current position of the mobile access point 300(1). Thus, the present set of policies controlling a given wireless device 100 can depend on the distance from the present position of the wireless device 100 to the present position of the first mobile access point. 300(1). As FIG. 3 illustrates, the set of applicable policies change as the mobile access point 300(1) gets closer to or farther away from the wireless device 100.

In some embodiments, the wireless device 100 is mobile, just like the access point 300(1). However, the localization schemes described above may still be utilized in order to determine the policies applicable to the wireless device 100.

Instead of implementing a fixed boundary, or "fence" based upon absolute geographic coordinates, differences between the coordinates of the wireless device 100 and the mobile access point 300(1) are used in order to determine whether to implement a policy. For example, if the distance between devices is less than or equal to the range designated for the first policy 302(1), then the policy applies to the wireless device 100. Conversely, if the wireless device is located at a farther distance than the maximum range of the policy 302(1), the policy will not apply.

Additionally, as shown in FIG. 3, additional mobile access points 300(2) may be used to invoke additional policies 302(2) if the requisite criteria (e.g., range) are met. Note that the mobile access points 300(1) and 300(2) may also be moving relative to one another (and the mobile device 100), such that the mobile device 100 may experience phasing in and out of enforcement of different policies.

Mobile and Access Point Apparatus

FIG. 4 is a block diagram illustrating the components of an exemplary wireless device 400 capable of GPS communication (see FIG. 1*a*) in accordance with one embodiment of the present invention.

The antenna 402 is designed to emit and receive electromagnetic waves according to a wireless or air interface standard. In one embodiment, the antenna 402 is adapted to communicate with a base station 200 which provides the wireless device 400 with access to a broader network (e.g., the Internet). In many embodiments, the RF module 404 comprises a transceiver adapted to convert the electromagnetic waves to current and ultimately digital data, and the data to current and then to electromagnetic waves (as applicable). One or more Rx and/or Tx amplifiers 408 may optionally be used to amplify signals for transmission, as is well known in the art.

The exemplary wireless device 400 of FIG. 4 further comprises a central processing unit (such as integrated circuit microprocessor 412 and/or DSP, discussed below) which is adapted to perform basic processing operations of the wireless device 400. Memory 414 comprises one or more storage devices capable of storing signals as bits of data. Memory 414 may therefore comprise any combination of volatile memory of non-volatile memory in accordance with the scope of the present invention (for example, DRAM, SRAM, flash memory, EAROM, EPROM, EEPROM, and/or myriad types of other memory modules).

The wireless device 400 can optionally comprise an audio controller 418 and one or more digital signal processors (DSPs) 416 for audio, signal, image and/or video processing. A power source 410 such as a battery provides power to the various components of the wireless device 400.

In one embodiment, the microprocessor 416 is adapted execute one or more programs 420 stored in memory 414 which inter alia transmit GPS coordinates from the GPS receiver 408 to a remote base station 200 over a wireless interface. The microprocessor 416 is further adapted to execute one or more programs 420 stored in memory 414, which, upon detecting a specific control signal, modify the functionality of the wireless device 400 according to the type of signal detected, or alternatively, by the contents of the signal provided (e.g., commands embedded within a WiFi beacon as described elsewhere herein). In one embodiment, once the wireless device's functionality has been changed according to a governing policy or multiple policies, the user of the wireless device cannot subsequently select the prior settings. The device is accordingly disabled in this regard, thereby assuring that the policy or policies are not circumvented by the user.

Figure 5:
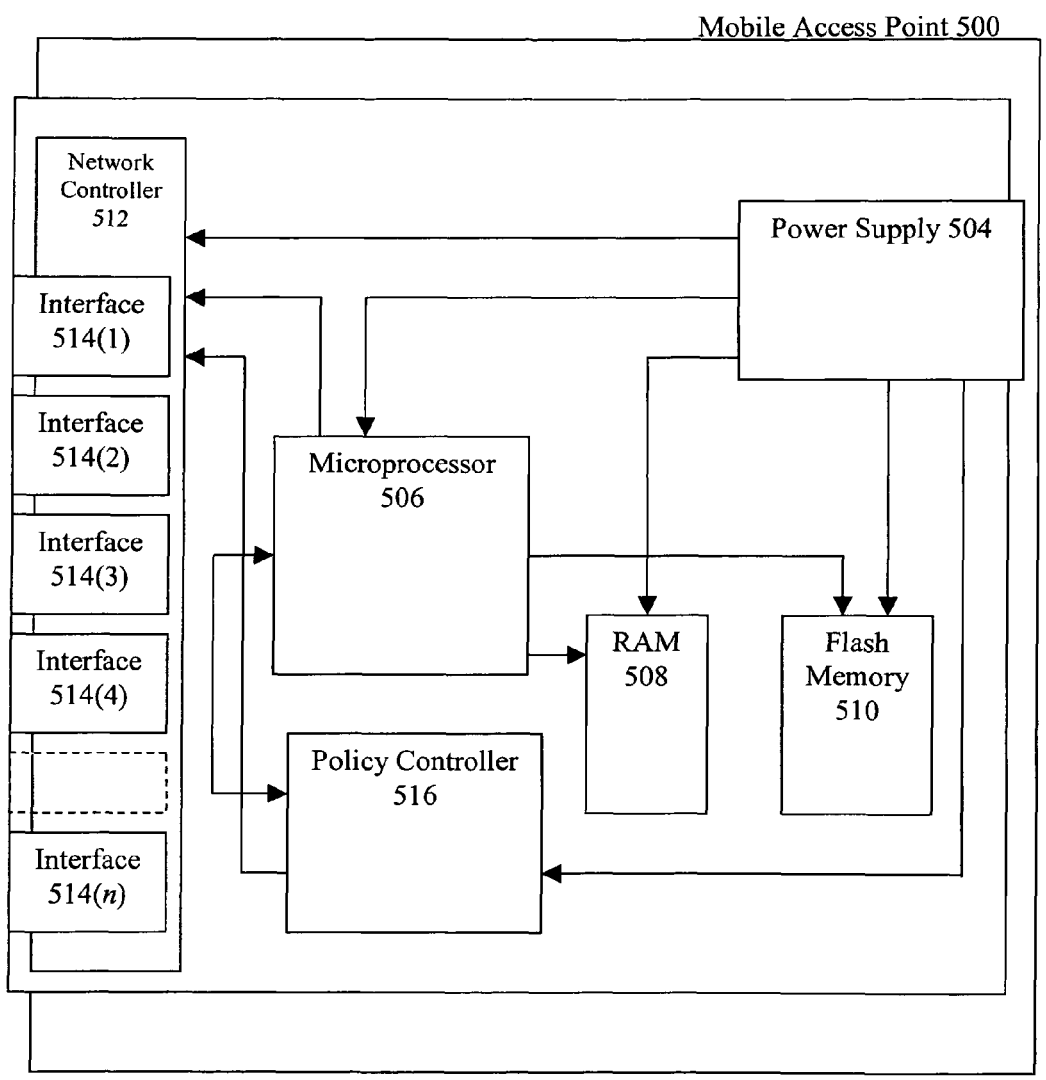
FIG. 5 is a block diagram illustrating one embodiment of a mobile device access point (AP) in accordance with the present invention.

FIG. 5 is a block diagram illustrating an exemplary configuration of a mobile access point (AP) in accordance with one embodiment of the present invention. As FIG. 5 illustrates, the mobile access point 500 comprises a microprocessor 506, a volatile memory source (such as RAM 508), a non-volatile memory source (such as flash memory 510), a power supply 504, and a network controller 512 comprising a set of communications interfaces 514(1-n).

The microprocessor 506 is adapted to perform basic processing operations of the mobile access point 500. Volatile and/or non-volatile memory sources (such as the RAM 508 and the flash memory 510) are adapted to store signals as bits of data. The power supply 504 is adapted to provide a source of power to the various components of the mobile access point 500.

The network controller 512 facilitates communications with one or more remote devices via the plurality of data/communications interfaces 514(1-n). According to one embodiment, these remote devices support wired and/or wireless network protocols (such as Ethernet, WiFi, WiMAX, MWBA, Bluetooth PAN or dialup profile, etc.).

A policy controller 516 comprises logic adapted to transmit one or more control signals to connected wireless devices. In one embodiment, the policy controller 516 is resident on or housed within the network controller 512. In a second embodiment, the policy controller 516 exists as a stand-alone circuit or logic board electrically coupled to the other components as required. In a third embodiment, the policy controller 516 comprises one or more software modules resident in one or more memory sources, such as the RAM 508 and/or the flash memory 510.

In one embodiment, the policy controller 516 comprises logic adapted to store information pertaining to designated policies. For example, a given policy may require muted ringers and reduced lighting when a wireless device is determined to be in a certain zone. In some embodiments, the policy controller 516 comprises zone information (such as an applicable range of GPS coordinates), the type of policy to be applied, and/or the classes of users which are to be affected by the policy.

Also, in many embodiments, the policy controller 516 facilitates the transfer of one or more control signals or commands to the wireless device 100 for the purpose of applying a set of policies to one or more wireless devices 100. In one variant, the control signal comprises a command disposed within the well known "beacon" frame format of the 802.11 WiFi Interface. This beacon frame format may comprise a plurality of vendor-specific information or data elements which may be used to convey policy information to the wireless device. It will be recognized, however, that other approaches for communicating with the mobile/wireless devices 100 may be used consistent with the invention, including for example use of Bluetooth communications signals, or cellular forward/reverse traffic or control channels, etc. as applicable.

In one variant, the vendor-specific command protocol is not known by the AP or base station; however, the AP/base station has a library of different commands for each of the different policies and mobile device types it may encounter. The AP/base station then merely "shotguns" the various commands for the different device types (for the policy or policies it wishes to enforce) out over the vendor-specific field(s) of the WiFi beacon, with the expectation that one will be recognized and read by the mobile device, and subsequently executed. This approach has the advantage of requiring no indigenous software modifications (at least for the signaling portion of the protocol) to the mobile devices, but rather only the AP or base station. If appropriate software controls for the display and audible ringer functions, etc. to be controlled by the policy are present, no further modifications to the mobile device are required.

In another embodiment, both the mobile device and the AP/base station comprise software components in the form of a distributed application (DA) or client/server relationship. The two processes can communicate via e.g., the aforementioned WiFi beacon (at least from AP to mobile device), with upstream or mobile-to-AP communications being accomplished over another extant or even dedicated channel.

In another variant, the mobile device is configured to transmit relevant configuration information (e.g., manufacturer code, model number or code, list of installed hardware or software, etc.) to the AP/base station in order to tell that device specifically what configuration of command is needed. This can be implicit (e.g., the AP takes the device configuration information received from the mobile device and enters a database or other source of information to determine a proper command protocol for the various subsystems of that particular device), or explicit (e.g., where the mobile device explicitly instructs the AP what protocol to use, or even provides a communication properly formatted so that the AP need only reply to that communication in order to invoke the desired operational policies).

As yet another alternative, metadata may be included with one or more content elements (e.g., video streams or files) sent between the AP and the mobile device in order to convey policy commands, especially those which are media or content-specific. For instance, in one variant, one or more policies are enforced against certain types of content sent or streamed between the devices, such as to cause different treatment of that content by the mobile device (or AP). One such example is copyright or DRM protection; the mobile device associated with a given AP may be forced to assent to DRM (e.g., "copy once", etc.) implementation or rules before the content is streamed or enabled for playback on the mobile device. Different codec or transcoding requirements, etc. can also be transmitted via the metadata so that the AP can globally cause certain policies to be adopted for those mobile devices receiving the content.

Myriad other approaches to communication of commands between the two devices will be recognized by those of ordinary skill given the present disclosure, and accordingly are not described further herein.

GUIs

Figure 6:
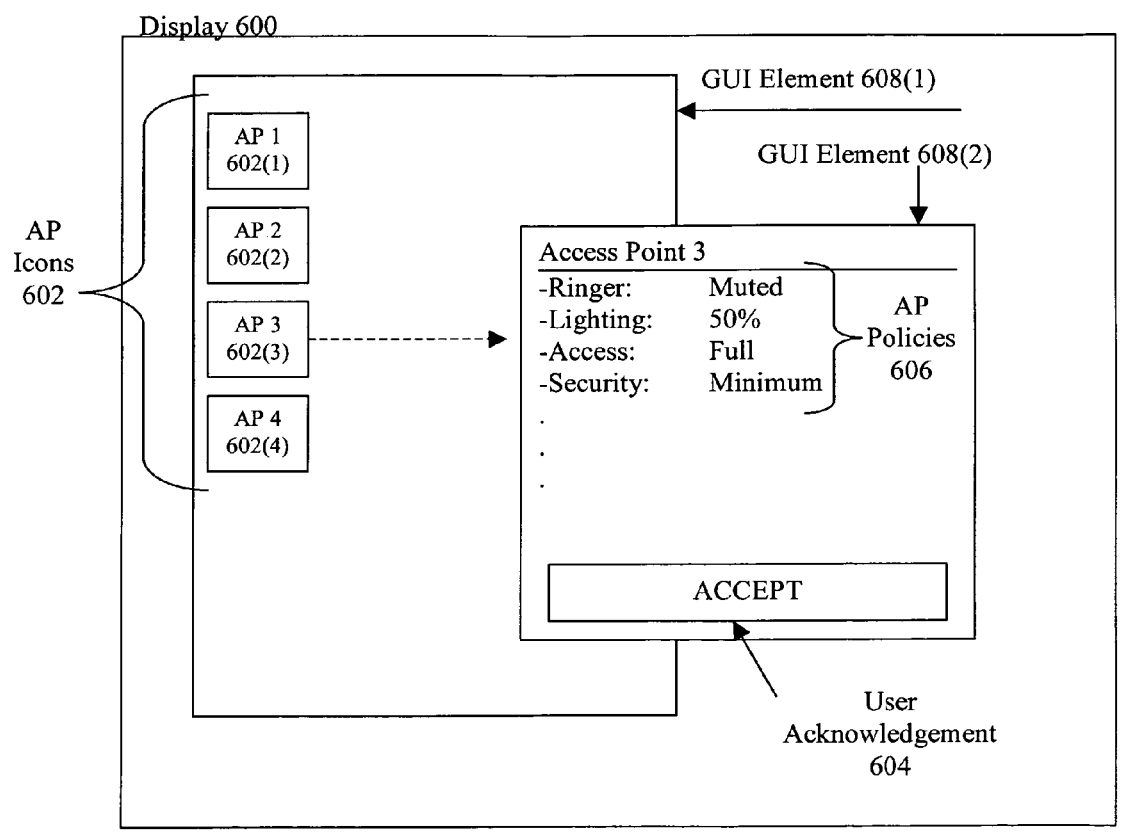
FIG. 6 is a block diagram illustrating one exemplary mobile device graphical user interface (GUI) useful with the present invention.

FIG. 6 is a block diagram illustrating one exemplary embodiment of a graphical user interface (GUI) that is useful with the present invention. A display 600 comprises a plurality of GUI elements 608. In the embodiment of FIG. 6, the GUI elements 608(1) and 602(2) both comprise windows or similar display segregation elements; however, it will be appreciated that the GUI elements may alternatively comprise any combination of windows, frames, display boxes, text fields, tables, tuples, or any other data representation in accordance with the scope of the present invention.

As shown by FIG. 6, the GUI element 608(1) comprises one or more access point (AP) icons 602. Upon a user's selection of a specific icon (for example, element 602(3) as shown in FIG. 6), a new GUI element is instantiated (in this case, GUI element 608(2)). In some embodiments, the list of applicable policies related to the corresponding access 606 point is displayed within the GUI Element 608(2). The list of AP policies 606 thus visually informs the user of the terms and conditions of associating his wireless device 100 with the selected access point (AP).

In other embodiments, one or more of the GUI elements 608 or the display device in general also comprise a mechanism for detecting a user input. In this manner, the user can acknowledge, accept, or "opt-in" to the policies listed on the GUI element 608(2) by providing said input. While the user acknowledgment 604 depicted by FIG. 6 comprises a single GUI "button", this button is merely illustrative. Any means of input detection can be used in accordance with the scope of the present invention including without limitation, text fields, checkboxes, selectors, pop-up windows, dial controls, specific keyboard sequences, selectable icons, fixed function keys (FFKs), voice recognition input, and/or other means facilitating input to the mobile device.

Figure 7:
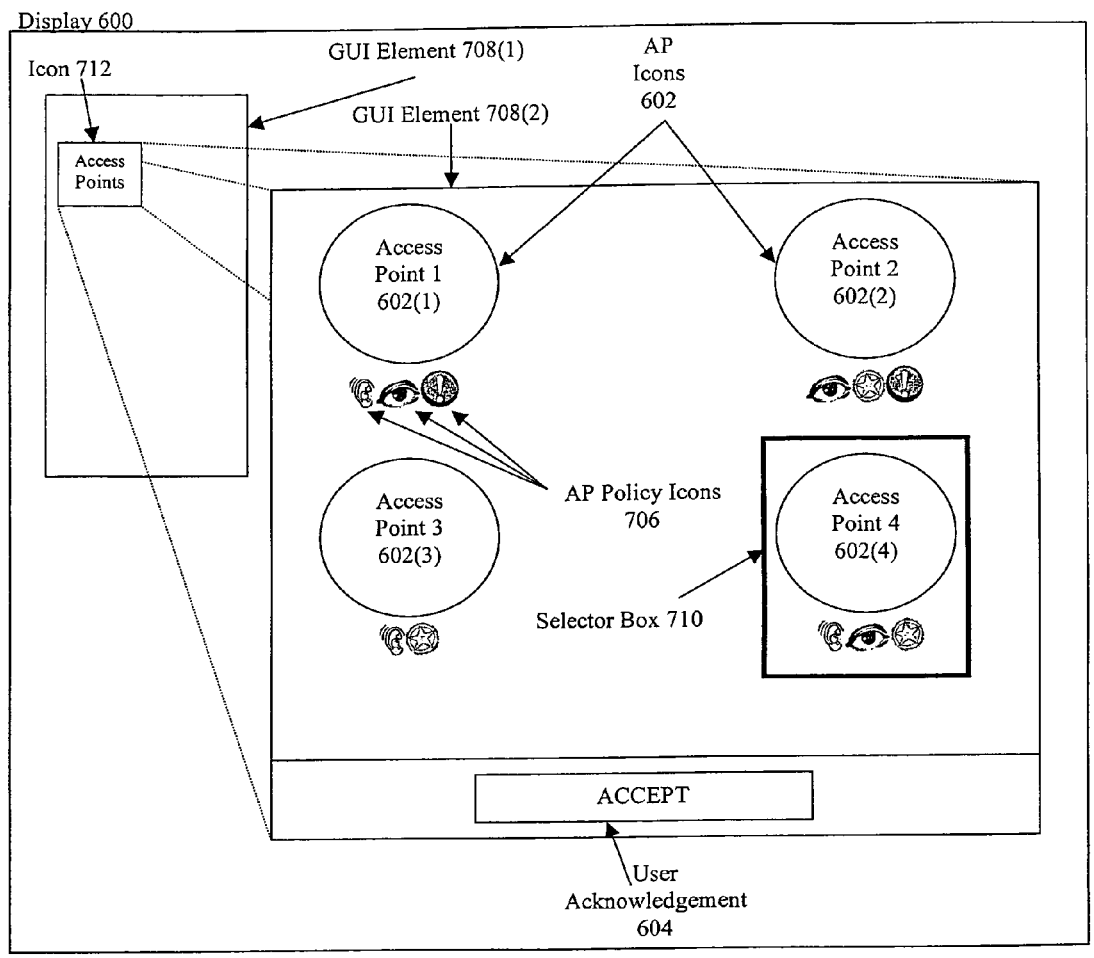
FIG. 7 is a block diagram illustrating a second embodiment of the graphical user interface.

FIG. 7 is a block diagram illustrating a second embodiment of a graphical user interface that is useful with the present invention. Just as in the embodiment of FIG. 6, a display 600 comprises a plurality of GUI elements 708(1) and 708(2). However, the arrangement and organization of the access point icons 602 is different in that a set of access point policy icons 706 visually represent each access point policy 606. For example, according to one embodiment, an "ear" icon (i.e., picture of an ear) represents a muted sound or ringer policy when associating with the access point, while the "eye" icon represents a reduced lighting policy. Note that the actual icons used may be of different sizes, colors, shapes, and/or different images than those depicted by FIG. 7 according to the scope of the present invention. Moreover, the icons may themselves be varied dynamically or modulated to convey additional information to the user (e.g., a modulating or blinking "eye" icon may indicate that the visual display policy is only enforced for certain functions or conditions, etc.).

In one embodiment, a selector box 710 of the type shown in FIG. 7 is used for selecting among a set of detected access points. According to a preferred embodiment, the selector box 710 is responsive to mouse coordinates, mouse clicks, and/or specific keyboard strokes (such as by depressing the TAB key), or user tactile input such as via a touch display. Just as in FIG. 6, a user acknowledgment 604 is provided to receive an indication that the user has accepted all of the policies represented by the AP policy icons 706 under the selected access point (in this case, Access Point 4 602(4)).

Note also, however, that mechanisms for accepting policies on a case-by-case basis may also be utilized, such as where acceptance of all policies put forth by the AP are not required for an AP/mobile device association to be maintained. For instance, security policies may be deemed "essential" or mandatory, yet display policies optional for the same AP. The user can therefore, via their GUI, selectively accept or decline policies on an individual basis, and optionally be alerted regarding which of these policies are mandatory (such as via a colored or modulating icon, or a notification if a mandatory policy is not accepted).

In certain embodiments, the wireless device 200 comprises a mechanism for implementing a user-specified policy mask or rule. For example, the user may specify to always accept quiet zone requirements, and to never accept Bluetooth- or cellular-restricted zones. In this manner, certain zones may advantageously be automatically (or user-permissively) filtered out from the user's list of available access points according to the user's specified policy. Alternatively, a graphic element (e.g., an "X") may be used to indicate the presence of the AP but the non-compliance of that AP with the user's rule(s). Such user-based rules may be entered for example via the aforementioned GUI interfaces, or alternatively via a menu or other structure within the mobile device application software.

Methods

Figure 8:
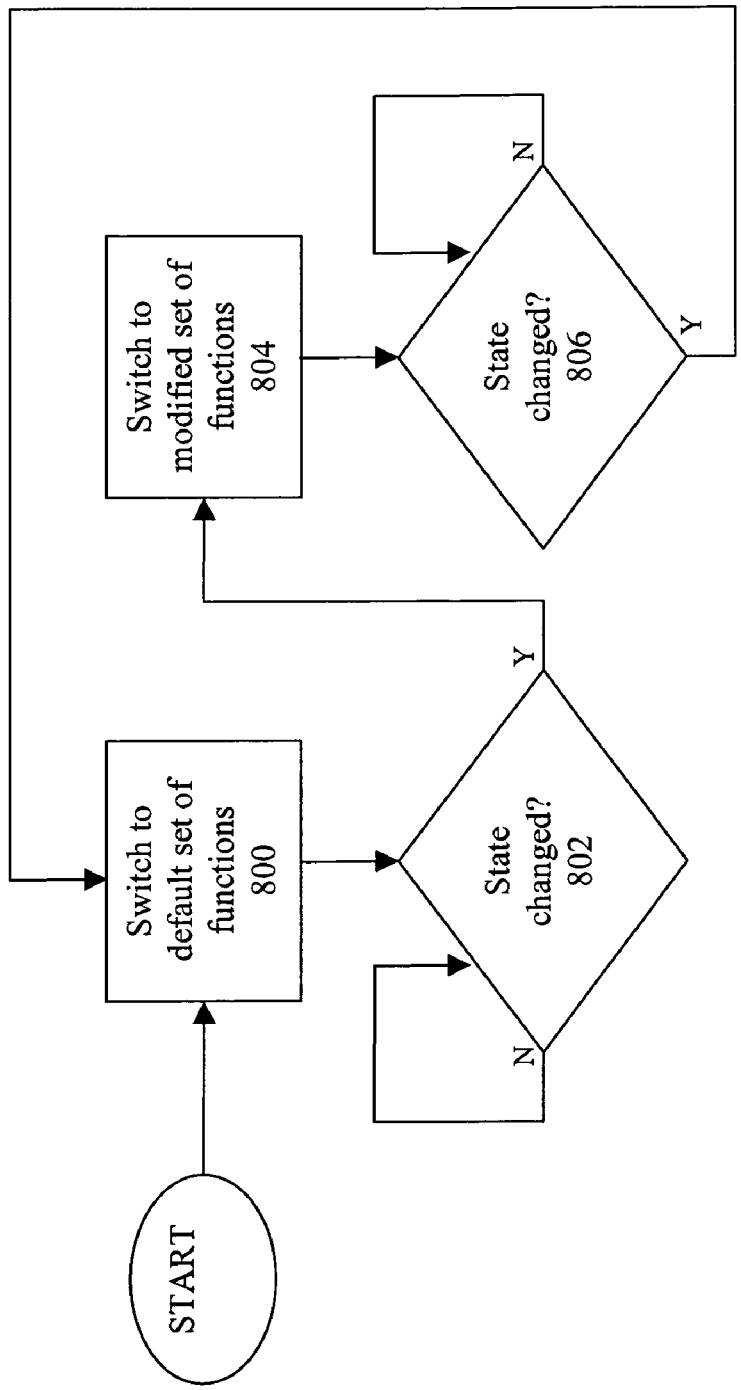
FIG. 8 is a logical flow diagram illustrating a first embodiment of the method of controlling a wireless device in accordance with the present invention.

FIG. 8 is a logical flow diagram illustrating a first embodiment of the method of controlling a wireless device in accordance with the present invention. First, a default set of functions (one or more) is selected in step 800. In this mode (at step 802), the wireless device continually listens for a signal that would trigger a state change. In some embodiments, the signal is transmitted by a remote access point upon detecting that the wireless device has entered a certain zone or geographic area. In other embodiments, the signal is transmitted by a remote access point upon creating an association with the wireless device. Exemplary methods of implementing these "triggers" has already been described above (see FIGS. 1-3 and accompanying text).

Upon receiving the signal, the wireless device then changes to a modified set of functionality (one or more modified functions or configuration changes) at step 804. For example, the change may require that all sound is disabled on the wireless device. Then, at step 806, the wireless device continually listens for a signal that would trigger another state change. For example, a signal may be transmitted by the remote access point upon detecting that the wireless device has now exited the zone or geographic area designated for the policy, or alternatively, that the access point has presently dissociated with the wireless device.

Note that although FIG. 8 depicts the original functionality being restored upon detection of a state change, this assumes that the state change was to the prior state (i.e., to the state corresponding to the functions available at step 800). However, this is merely illustrative; in other embodiments, multiple sets of differing functionality may in fact be required. For example, as the wireless device passes from Zone A to Zone B to Zone C, each zone may have a different set of associated policies, thus requiring the wireless device to transition among several states which are distinct from its original state.

Figure 9:
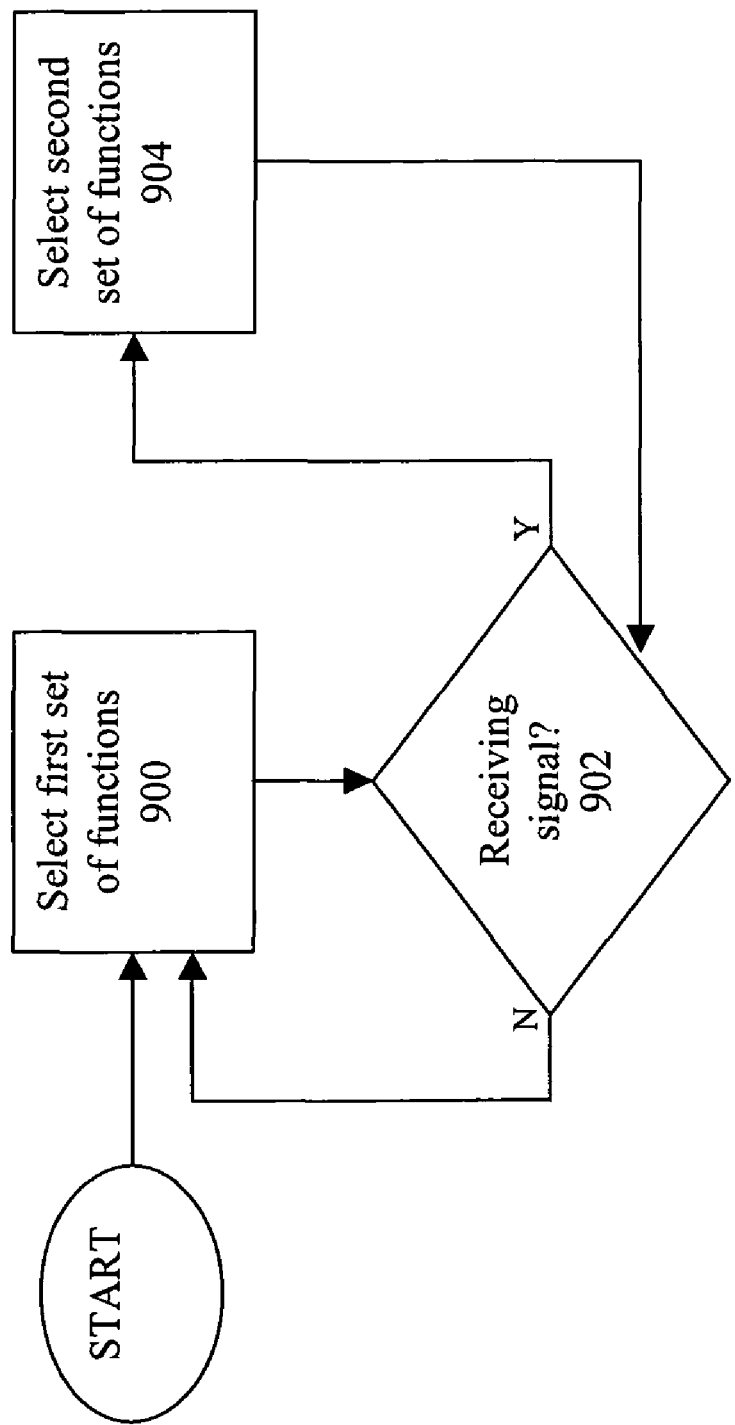
FIG. 9 is a logical flow diagram illustrating a second embodiment of the method of controlling a wireless device in accordance with the present invention.

FIG. 9 is a logical flow diagram illustrating a second embodiment of the method of controlling a wireless device in accordance with the present invention. A first set of functions is selected at step 900. At step 902, the wireless device continually listens for one or more signals transmitted from a remote access point. When the wireless device is receiving the signals, a second set of functions is selected at step 904. When the wireless is not receiving the signals, the first set of functions (or a default set of functions) is selected at step 900.

Figure 10:
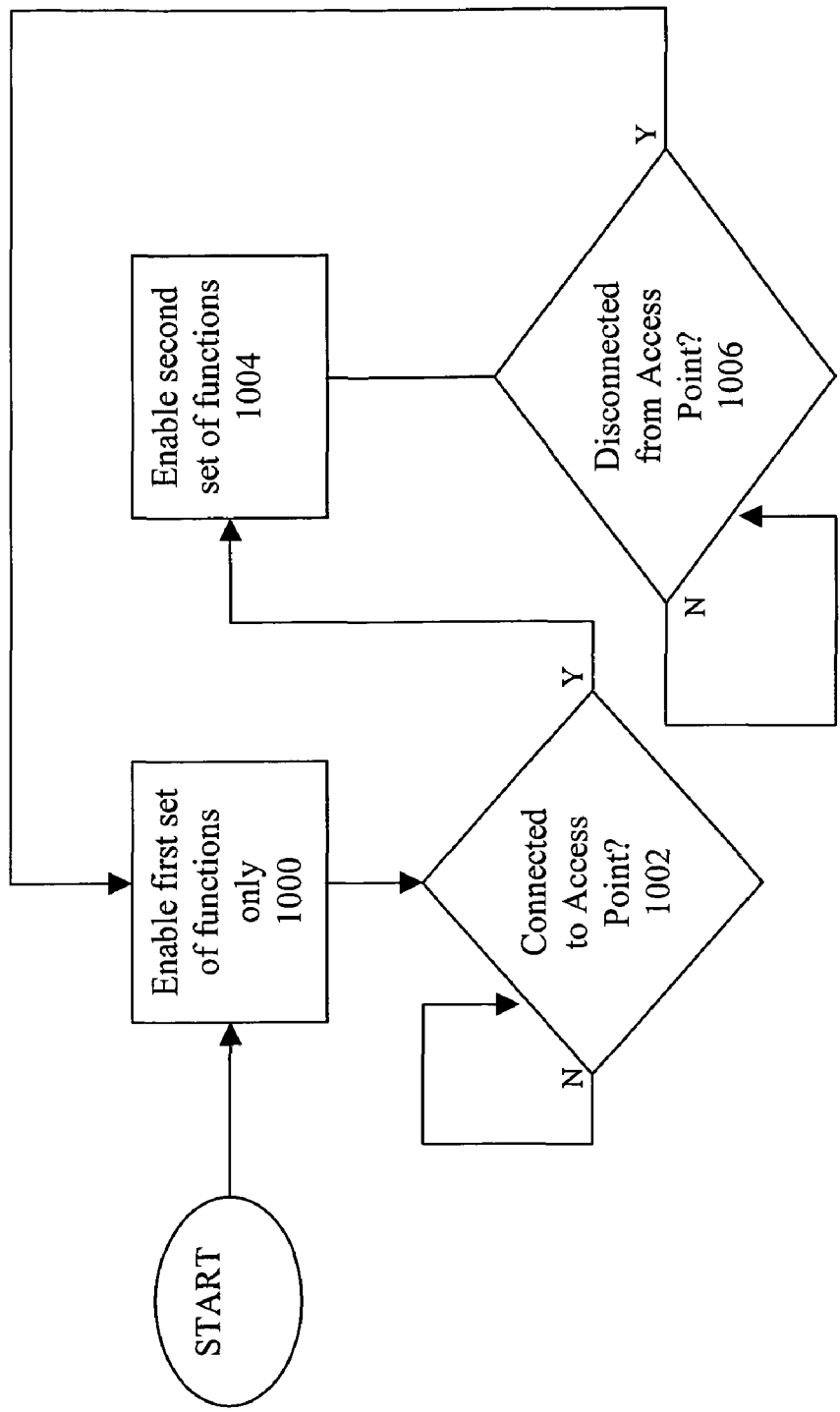
FIG. 10 is a logical flow diagram illustrating a third embodiment of the method of controlling a wireless device in accordance with the present invention.

FIG. 10 is a logical flow diagram illustrating a third embodiment of the method of controlling a wireless device in accordance with the present invention. A first set of functions is enabled at step 1000. Next, the wireless device at step 1002 continually checks whether it is presently connected to an access point requiring a designated policy. Upon connecting to such an access point, a second set of functions is enabled at step 1004. Note that the second set of functions can either be in addition to, or in lieu of, the first set of functions. The wireless device then reverts back to its original functionality (the first set of functions only) or a default function set upon detecting a disconnection from the access point at step 1006.

Policies and Templates

A wide range of policies, whether AP-specified or user-specified, can be utilized consistent with the present invention, as described in greater detail below.

For example, in some embodiments, the policies relate to "quiet" zones. According to these embodiments, audible ringers are disabled or muted upon the mobile device receiving one or more control signals/commands. In other embodiments, the policies relate to "dark" zones. In these embodiments, the wireless device is required to be set to a certain light intensity and/or brightness (or alternatively, to a specific lighting configuration or modulation pattern). In certain variants, the reduction in light intensity relates to the wake-up function of the wireless device (such as when receiving an incoming call).

In other variants, the lighting policy is changed according to one or more auto-sensing features of the wireless device 100, for example, as a function of a detected amount of ambient light and one or more threshold parameters actuated by the access point or base station.

In certain embodiments, the policies relate to enabling/disabling Bluetooth inquiry, pairing and/or bonding functionality. Such inquiry or pairing/bonding can be disruptive in certain settings (e.g., in a movie theater, or location where the user's undivided attention is required), since it may (i) alert the receiving user, and (ii) require confirmation or acceptance of the pairing/bonding request. Using the techniques of the present invention, such Bluetooth functions may be disabled upon the wireless device 100 entering a certain zone, or associating with the mobile access point 500. In one embodiment, this is accomplished using the WiFi beacon described above (i.e., in device having both Bluetooth and WiFi capability), in that Bluetooth has no "beacon" per se, although other communication channels may be used for communicating the command(s) as well.

Additional embodiments comprise policies related to radiation emission and/or electromagnetic interference (EMI). For example, in one embodiment, a policy prohibits a wireless device from increasing power (such as on its cellular or WiFi interface) so as to mitigate interference with other indigenous devices. For instance, sensitive electronic instruments of other devices in a given zone may require that radiated power in certain frequency bands (e.g., 1.8 GHz, 2.4 GHz, etc.) or of certain multiple access or modulation types (e.g., DSSS, OFDM, FHSS, etc.) be held to low levels so as to avoid interference or damage.

Similarly, a function may optionally be included which turns on/off or otherwise affects the operation of the device Bluetooth interface when a WiFi association with an AP is detected, or vice versa, so as to mitigate mutual interference. Specifically, devices with co-existing and potentially interfering air interfaces (e.g., WiFi and Bluetooth, both in the 2.4 GHz band) might have one of the air interfaces disabled or enter a different mode of operation (such as Bluetooth adaptive frequency hopping or AFH) so as to mitigate the effects of interference between the two interfaces. For instance, one approach would be to have the mobile device, when operating its Bluetooth interface, periodically check to see if an association was requested or formed between the WiFi interface of the same device and an AP; if so, one policy (imposed by either the mobile device or the AP after the association was formed) might be to apply a prioritization rule that would shut down the Bluetooth interface (or mitigate its radiated power) so as to avoid at least some interference with the WiFi interface. Moreover, one or more of the methods described in co-pending and co-owned U.S. patent application Ser. No. 12/006,992 filed Jan. 7, 2008 and entitled "METHODS AND APPARATUS FOR WIRELESS DEVICE COEXISTENCE", incorporated herein by reference in its entirety, may be used consistent with the present invention in order to mitigate the effects of such wireless signal interference.

In some embodiments, the policy relates to display or access of content over a network. Thus, certain types of content may be filtered or masked in order to block or restrict the wireless device's capability to access to such content. For instance, access to certain IP addresses or device ports/sockets may be blocked, thereby frustrating certain types of access or operations.

In certain embodiments, the policy relates to security (including without limitation integrity protection, authentication, and privacy). For instance, certain types of data may be, as a class, in need of high levels of protection due to their nature, while others carry few if any security requirements. Therefore, according to some embodiments, the policy allows wireless devices 100 to operate only if they can implement a certain minimum level of security. In this manner, various embodiments of the present invention enable security zones to be designated.

In another such application, entry of a wireless device within a predetermined range of an AP (or upon the precedent communications between the AP and the mobile unit for establishing an association occurring) may be used to trigger an enhanced security mode; e.g., increase Bluetooth security mode from Mode 0 to Mode 1 or Mode 2. Another policy may require Bluetooth devices to operate in only Security Modes 1 or 2 (and not Mode zero)

Conversely, one policy may be that all data encryption or other means of frustrating access to data must be removed, such as in an examination setting so that a proctor can see the substance of all communications occurring on mobile devices associated with a given AP.

In other embodiments, the policies relate to sleep or wake-up modes associated with the wireless device 100. In some variants, the control signal is adapted to force the device into sleep mode (for example, as upon entering a zone or connecting with a specific access point) or alternatively, to force the device to "wake-up" in order to implement a specific policy. For example, in the context of the iPhone device manufactured by the Assignee hereof, a hardware switch controlled by software within the device is used to accomplish this function; however, other approaches may be used.

It will also be appreciated that while the various aspects of the present invention can be used to enforce restrictive policies (i.e., those which disable or prevent certain types of functions from being utilized or invoked), it may also be used to assure that certain types of functions are invoked (or at least available for use). For instance, in one embodiment, the designated "zone" or radius associated with a base station or access point is used to assure certain types of capabilities exist; e.g., emergency notification or positioning functions are turned on and in standby. Hence, a user entering within the aforementioned zone or radius with their wireless mobile device in a mode which disables audible ringing on incoming calls might experience a "re-enablement" of the ringing function for such incoming calls; e.g., a doctor or fireman could have a home or premises AP policy that their mobile device is automatically enabled to ring in a certain fashion (e.g., at elevated volume or according to a different audible pattern or one unique to that particular user or circumstance), and perhaps modulate the display ("flash") for certain types of incoming communications when they associate with their premises AP, such when they get home from work and are "on call". This would help prevent any missed communications or having them go to voicemail unnoticed, etc.

In still another embodiment, when coverage of a designated area (e.g., a classroom or lecture hall where an examination is to be given) is by two or more local hotspots, one hotspot (e.g., AP) can instruct the mobile device to "shun" or ignore other associations with other hotspots so as to avoid a user doing an "end-run" around a communications suppression policy via a second hotspot. A list of mobile devices which do not adhere to the shunning policy may also be generated by AP or another entity responsible for policy directives, and these mobile devices (and optionally their owners) can be excluded from the zone of interest; e.g., from taking the exam.

As yet another policy, an AP or base station might enforce capacity or bandwidth limitations on one or more communication or data interfaces. For instance, a WiFi interface existing between the mobile device and AP may be throttled or capped in terms of bandwidth allocated to the mobile device, or other allocation policies invoked with regard to that interface; see, e.g., co-pending and co-owned U.S. patent application Ser. No. 12/008,623 entitled "APPARATUS AND METHODS FOR NETWORK RESOURCE ALLOCATION" filed Jan. 10, 2008, which is incorporated herein by reference in its entirety, for exemplary apparatus and methods useful for allocating capacity within a wireless node.

Moreover, as described elsewhere herein, other communications interfaces (e.g., cellular, WiMAX, etc.) associated with that particular mobile device can be disabled as part of the policy enforcement.

Any combination of the aforementioned policies can be utilized with various embodiments disclosed herein, and the above examples are merely illustrative. Myriad other policies can be utilized in accordance with the scope of the present invention.

In addition to the various policies described above, the present invention may also make use of templates or "profiles" which impose sets of certain policies based on the context of the application. These templates may be user-generated, or alternatively generated by the service provider or the administrator/proprietor of the base station or AP.

For example, in one variant, a template for a movie theater ("Movie Theater") might contain the following policies: (i) disable audible ringer; (ii) vibrating mode enabled (low); (iii) no wakeup for incoming calls or text messages; and (iv) display enabled for "dim" mode only. In the case where a user has the option of imposing their own policies, they might simply run down a list of different profiles to pick the appropriate one, and then invoke the polices associated with that profile by selecting the "Accept" function of the GUI of FIGS. 6 and 7 for example. Alternatively, the user might specify in a rule that it is always acceptable to utilize or accept the "Movie Theater" policy set, thereby allowing the AP at the movie theater to automatically configure their mobile device upon association or coming within a prescribed range of the AP.

In another variant, the user-prescribed rules or templates can be transmitted from the mobile device to a requesting AP (such as upon initial association), in effect telling the policy controller 516 of the AP what policies the user is willing to accept. If the mandatory policy set for that AP is satisfied by that user, then an association will be permitted. If not, the user may be alerted as to the one or more offending restrictions/selections, and given an opportunity to correct it/them.

Business Methods and Applications

The methods and apparatus for enforcing one or more policies on device users described above lends itself to various types of commercial applications and business models.

As a first illustration of the foregoing principles, assume that a user enters a movie theater. While the user is in the movie theater, the mobile device deactivates its cellular communications interface and/or automatically sets the device to a silent mode. When the user leaves the movie theater, the portable device enables phone communications and/or restores the ringer setting to the setting utilized prior to the device's deactivation. Hence, a theater owner or operator may feasibly charge additional in the way of ticket price (or offer as a free incentive) the feature of "no cell phone interruptions" during certain movies.

In another embodiment, a WiFi-based command is emitted within a certain facility (for example, a locker room, a government building, or the aforementioned movie theater). The command instructs the device to enter into a "lockdown" mode. Different facilities may enact different "lockdown" modes. For instance, a locker room facility may issue a command that prevents use of a cellular phone camera or laptop computer camera while in that area, thereby preventing surreptitious imaging of customers/users. Customers of such facilities may be willing to pay extra for the peace of mind associated with knowing that they are not being secretly photographed.

Likewise, an airline operator or airport may cause the mobile device to enter into an "airplane" mode, wherein all electromagnetic emissions of significance are prevented, at least during flight, thereby more affirmatively preventing interference with aircraft communications or instrumentation and enhancing safety. Similarly, if a terrorist threat or other security breach is detected, the airport may disable at least a portion of the wireless communications within a terminal using a policy command, thereby potentially frustrating communications between individual terrorists or other criminals.

In enterprise or corporate settings, the present invention finds numerous applications. For instance, the audible policy previously described may be used in conference rooms or meetings with an AP so as to automatically mute each person's mobile device (e.g., cellular telephone) so as to avoid interruptions. Moreover, security policies may be invoked (e.g., no—non-secure or unencrypted voice or data communications over any AP or cellular phone within a given region), or restrictions on access to certain internetworks, IP addresses, servers, etc. from mobile devices.

In an automotive setting, the present invention may be used to enforce policy upon a mobile device (e.g., smartphone or the like) while a user is driving, such as via the aforementioned position location (e.g., GPS) apparatus. For instance, one policy of a cellular service provider may be to blank out or prevent incoming calls to a user while that user is in a vehicle that is determined to be moving over time, unless so-called "hands free" technology (e.g., a suitable Bluetooth headset profile) is in use simultaneously. In this fashion, the user would be all but prevented from being distracted by their cellular phone while driving unless they are operating in hands-free mode (as will be mandated by California State law in July of 2008 for example).

As evidenced by the foregoing examples, the present invention finds widespread potential application in any number of economic or business-related arenas, due in large part to the ubiquitous nature of wireless mobile devices in modern society. By freeing a mobile device user (and in fact, a premises owner or operator, or enterprise) from having to reconfigure their mobile device manually for various different situations they may encounter during any given period of time, a great amount of time may be saved, thereby resulting in increased satisfaction and user experience (as well as productivity). Moreover, many users would be more than willing to pay simply for the convenience of having the mobile device in effect "adapt itself" to their current context; e.g., in the movies, at a meeting, on call at home, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A base station apparatus comprising:
   a transceiver module adapted to communicate with a client wireless device;
   a first module adapted to detect that the client wireless device comprising a first set of functions is within a first range;
   a second module adapted to identify one or more modifiable portions of the first set of functions;
   where the identification of the one or more modifiable portions of the first set of functions is based at least in part on received client wireless device information relating to the one or more modifiable portions; and
   a third module adapted to cause at least one of the first set of functions to be modified based at least in part upon the first module detecting that the wireless device is within the first range and the identified one or more modifiable portions, and to cause notification for a user of the client wireless device to be provided via the client wireless device; and
   wherein the modification of the at least one of the first set of functions is performed after said notification.

2. The apparatus of claim 1, wherein the client wireless device comprises a cellular-enabled mobile device having a wireless LAN (WLAN) interface, and the apparatus is contained substantially within the cellular-enabled mobile device.

3. The apparatus of claim 2, wherein the first set of functions comprises audible ringer functionality, and wherein the modification comprises suppression or mute of the audible ringer functionality.

4. The apparatus of claim 1, wherein the first set of functions comprises a first lighting configuration having a first intensity associated therewith, and wherein the modification comprises a second lighting configuration having a second intensity associated therewith, said second intensity being less than said first intensity.

5. The apparatus of claim 4, wherein the second lighting configuration comprises fewer selectable settings than the first lighting configuration.

6. The apparatus of claim 1, wherein the first set of functions comprises Bluetooth inquiry and pairing functions, and wherein the modification comprises disablement of at least one of said inquiry and pairing functions.

7. The apparatus of claim 1, wherein the first set of functions comprises a first power setting, and wherein the modification comprises a second power setting, said second setting configured to consume less electrical power than said first setting.

8. The apparatus of claim 1, wherein the first set of functions comprises a first security policy, and wherein the modification comprises a second security policy which imposes higher security requirements than said first policy.

9. The apparatus of claim 8, wherein the second access policy comprises at least:
   an authentication requirement;
   a password requirement; and
   an encryption requirement.

10. The apparatus of claim 1, wherein the first set of functions does not require that the wireless device remain in sleep mode, and wherein the modification requires that the wireless device: (i) enter and remain in sleep mode while within said first range; or (ii) remain in sleep mode while within said first range if already in said sleep mode when first entering within said first range.

11. The apparatus of claim 1, wherein the first module is adapted to detect that the wireless device is within the first range using at least global positioning system (GPS) signals.

12. The apparatus of claim 1, wherein the first module is adapted to detect that the wireless device is within the first range using at least triangulation based on two or more radio frequency signals.

13. The apparatus of claim 1, wherein the first module is adapted to detect that the wireless device is within the first range based on association or attempted association of the wireless device with the base station access point.

14. The apparatus of claim 1, wherein the wireless device comprises a cellular-enabled mobile device having a wireless LAN (WLAN) interface, and the base station apparatus comprises a WLAN interface capable of communicating with the WLAN interface of said mobile device.

15. A wireless device comprising:
   a first module adapted to receive a signal from a transmitting device, the signal comprising at least one command adapted to invoke changes in a plurality of functions of the wireless device, the plurality of functions selected from the group consisting of: (i) a display function; (ii) an audible alert or alarm function; (iii) a power conservation mode; and (iv) a communications interface mode;
   a second module adapted to process the at least one command to change the plurality of functions of the wireless device;
   a user interface module adapted to determine whether a user of the wireless device has agreed to accept the changes before the command is processed by the second module; and
   a third module adapted to transmit to the transmitting device information relating to the plurality of functions of the wireless device;
   wherein the selection of the changes in the plurality of functions is based at least in part on the information relating to the plurality of functions of the wireless device.

16. The wireless device of claim 15, wherein said device further comprises logic adapted to transmit information relating to whether a user of said wireless device has agreed to invoke said changes to a wireless base station or access point in communication with said wireless device.

17. The wireless device of claim 15, wherein one or more of said display functions comprises adjustment of at least one of the brightness and intensity of the display of said wireless device.

18. The wireless device of claim 15, wherein one or more of said audible alert or alarm functions comprises adjustment of the volume of an audible sound that would otherwise be generated by said wireless device.

19. The wireless device of claim 15, wherein one or more of said communications interface modes comprises prevention of at least one mode of communication between said wireless device and another proximate wireless device.

20. A method of modifying a set of functions within a user wireless mobile device, wherein the user wireless mobile device comprises a first set of functions, comprising:
   determining the user wireless mobile device is within a first area;
   evaluating the first set of functions of the user wireless mobile device for acceptable modifications;
   identifying one or more modifications of the first set of functions to a base station apparatus by transmitting to the base station apparatus information relating thereto;
   receiving at least one command adapted to invoke one or more of the evaluated first set of functions within the detected user wireless mobile device; and
   implementing the one or more of modifications of the first set of functions at the user wireless mobile device in accordance with the received at least one command.

21. The method of. claim 20, wherein the one or more of first set of functions comprises: (i) a display function; (ii) an audible alert or alarm function; (iii) a power conservation mode; and (iv) a communications interface mode.

22. The method of claim 20, wherein responsive to the user wireless mobile device leaving the first area, reverting the one or more set of functions to a setting in use prior to the changing.

23. The method of claim 20, wherein the detection of said user wireless mobile device being within a first area is performed using at least global positioning system (GPS) sinnals.

24. The method of claim 20, wherein the detection of the user wireless mobile device being within the first area is performed using at least a location determination, the determination based on two or more radio frequency signals.

25. The method of claim 20, wherein the detection of the user wireless mobile device being within the first area is based on association or attempted association of the user wireless mobile device with a base station or access point.

26. The method of claim 20, wherein the first set of functions comprises a first power setting, and wherein the modification comprises a second power setting, the second setting consuming less electrical power than said first setting.

27. The method of claim 20, wherein the first set of functions comprises a first lighting configuration having a first intensity associated therewith, and wherein the modification comprises a second lighting configuration having a second intensity associated therewith, said second intensity being less than said first intensity.

28. The method of claim 20, wherein the first set of functions comprises Bluetooth inquiry and pairing functions, and wherein the modification comprises disabling at least one of said inquiry and pairing functions.

29. The method of claim 20, wherein the first set of functions comprises audible ringer functionality, and wherein the modification comprises suppressing or muting the audible ringer functionality.

* * * * *